United States Patent
Jimichi et al.

(10) Patent No.: US 10,044,282 B2
(45) Date of Patent: Aug. 7, 2018

(54) POWER CONVERSION DEVICE

(71) Applicant: Mitsubishi Electric Corporation, Chiyoda-ku (JP)

(72) Inventors: Takushi Jimichi, Chiyoda-ku (JP); Tatsuya Okuda, Chiyoda-ku (JP); Osamu Mori, Chiyoda-ku (JP); Takaharu Ishibashi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/556,187

(22) PCT Filed: Feb. 24, 2016

(86) PCT No.: PCT/JP2016/055501
§ 371 (c)(1),
(2) Date: Sep. 6, 2017

(87) PCT Pub. No.: WO2016/152366
PCT Pub. Date: Sep. 29, 2016

(65) Prior Publication Data
US 2018/0054136 A1      Feb. 22, 2018

(30) Foreign Application Priority Data

Mar. 24, 2015   (JP) ................. 2015-060607

(51) Int. Cl.
*H02M 3/335*    (2006.01)
*H02M 1/08*     (2006.01)
*H02M 1/00*     (2006.01)

(52) U.S. Cl.
CPC ......... *H02M 3/33584* (2013.01); *H02M 1/08* (2013.01); *H02M 3/33515* (2013.01);
(Continued)

(58) Field of Classification Search
CPC .... H02M 3/33584; H02M 1/08; H02M 1/083; H02M 1/1088; H02M 3/33515;
(Continued)

(56) References Cited

U.S. PATENT DOCUMENTS 5,027,264 A        6/1991  DeDoncker et al.
2012/0218800 A1 *  8/2012  Jimichi ............. H02M 7/53803
                                                           363/131
(Continued)

FOREIGN PATENT DOCUMENTS

JP    WO 2013121665 A1 *  8/2013  ........ H02M 3/33584

OTHER PUBLICATIONS

International Search Report dated Apr. 26, 2016 in PCT/JP2016/055501 filed Feb. 24, 2016.

(Continued)

*Primary Examiner* — Gustavo Rosario Benitez
(74) *Attorney, Agent, or Firm* — Oblon, McClelland, Maier & Neustadt, L.L.P.

(57) ABSTRACT

Using two converters placed in a primary-side and a secondary-side and each configured as a single-phase full-bridge, and one single-phase transformer TR, a power conversion device converts DC power of a primary-side capacitor to which a primary-side DC voltage is applied, to DC power of a secondary-side capacitor to which a secondary-side DC voltage is applied, through a transformer. A control device sets a dead time Td1 for the converter serving as a power-transferring side converter, to be equal to or less than a current-polarity reversal time Tcmtt, to thereby surely achieve zero-voltage switching.

15 Claims, 17 Drawing Sheets

(52) U.S. Cl.
CPC .... *H02M 1/083* (2013.01); *H02M 2001/0054* (2013.01); *H02M 2001/0058* (2013.01)

(58) Field of Classification Search
CPC ............ H02M 3/335; H02M 3/33507; H02M 3/33523; H02M 3/3353; H02M 3/33569; H02M 2001/0048; H02M 2001/0054; H02M 2001/0058
See application file for complete search history.

(56) References Cited

U.S. PATENT DOCUMENTS

| | | | | |
|---|---|---|---|---|
| 2012/0249059 | A1* | 10/2012 | Matsumae | H02M 3/337 320/107 |
| 2013/0301304 | A1* | 11/2013 | Murakami | H02M 3/335 363/17 |
| 2015/0229225 | A1* | 8/2015 | Jang | H02M 3/285 363/17 |
| 2015/0349647 | A1* | 12/2015 | Zane | H02M 3/33507 363/17 |

OTHER PUBLICATIONS

Rik W. A. A. De Doncker et al., "A Three-Phase Soft-Switched High-Power-Density dc/dc Converter for High-Power Applications", IEEE Transactions on Industry Applications, Jan./Feb. 1991, vol. 27, No. 1, pp. 63-73.

Mustansir H. Kheraluwala et al., "Performance Characterization of a High-Power Dual Active Bridge dc-to-dc Converter", IEEE Transactions on Industry Applications, Nov./Dec. 1992, vol. 28, No. 6, pp. 1294-1301.

* cited by examiner

MODE0

MODE2

MODE3

MODE4

MODE4

MODE0

MODE2

MODE3

MODE0

MODE1A, 1B

MODE2

MODE3

MODE4

MODE0

MODE1A, 1B

MODE2

MODE3

POWER CONVERSION DEVICE

TECHNICAL FIELD

The present invention relates to a power conversion device for performing power conversion between DC power and other DC power by using semiconductor switching elements, and in particular, to a technology to reduce a power loss that occurs in each of the semiconductor switching elements.

BACKGROUND ART

Power conversion devices that convert DC power to other DC power have been proposed heretofore. In such cases, a single-phase full-bridge converter is configured using semiconductor switching elements. The single-phase full-bridge converter is a converter that converts DC power to AC power, or converts AC power to DC power. Then, using two converters each being said single-phase full-bridge converter, their respective AC terminals are connected to each other through a transformer, to thereby achieve a power conversion device which can perform DC/DC conversion and whose primary side and secondary side are insulated from each other.

Further, such a DC/DC conversion circuit has also been proposed in which two three-phase bridge converters are used instead of the single-phase full bridge converters, and their respective AC terminals are connected to each other through a three-phase transformer (see, for example, Patent Document 1 and Non-Patent Document 1).

Furthermore, such a power conversion device has also been referenced which can perform DC/DC conversion with a low loss in such a manner that a snubber capacitor is used for each of the semiconductor switching elements to thereby achieve soft switching, namely, zero-voltage switching which causes the semiconductor switching element to perform turn-on operation at zero voltage (see, for example, Non-Patent Document 2).

CITATION LIST

Patent Document

Patent Document 1: U.S. Pat. No. 5,027,264

Non-Patent Document

Non-Patent Document 1: "A Three-phase Soft-Switched High-Power-Density dc/dc Converter for High-Power Applications," IEEE Transactions on Industry Applications, vol. 27, no. 1, January/February, 1991.
Non-Patent Document 2: "Performance Characterization of a High-Power Dual Active Bridge dc-to-dc Converter," IEEE Transactions on Industry Applications, vol. 28, no. 6, November/December, 1992.

SUMMARY OF THE INVENTION

Problems to be Solved by the Invention

In each of the above prior art documents, the power conversion device is referenced which is configured with the single-phase full bridges or the three-phase bridges and converts DC power to other DC power, and further, it is disclosed that so-called zero-voltage switching can be achieved.

However, even with the same circuit configuration, the zero-voltage switching can not be achieved in some cases depending on conditions, and thus there is a problem that the power conversion device is insufficient in surely achieving DC/DC conversion with a low loss.

An object of the invention is to provide a power conversion device which can surely achieve zero-voltage switching, to thereby convert DC power to other DC power with a low loss.

Means for Solving the Problems

A power conversion device according to the invention comprises: a primary-side converter which comprises plural primary-side switching legs each connected between both electrodes of a primary-side capacitor and each including positive-side and negative-side semiconductor elements which are serially connected to each other and which are each provided with a snubber capacitor connected in parallel thereto, said primary-side converter performing power conversion between primary-side AC terminals each drawn out from an intermediate connection point of each of the primary-side switching legs, and the primary-side capacitor; a secondary-side converter which comprises plural secondary-side switching legs each connected between both electrodes of a secondary-side capacitor and each including positive-side and negative-side semiconductor elements which are serially connected to each other, said secondary-side converter performing power conversion between secondary-side AC terminals each drawn out from an intermediate connection point of each of the secondary-side switching legs, and the secondary-side capacitor; an inductance element connected between the primary-side AC terminals and the secondary-side AC terminals; and a control device which controls turning on/off of semiconductor switching elements which constitute the respective semiconductor elements, to thereby perform power transferring/receiving of DC power between the primary-side capacitor and the secondary-side capacitor.

The capacitance of the snubber capacitor is set so that, at the time the primary-side converter executes a power-transferring operation, in that converter, a polarity of a current flowing through the AC terminals changes after completion of charging/discharging of the snubber capacitor due to changes in on/off states of the semiconductor elements;

The control device controls said turning on/off, by setting a short-circuit prevention period Td for preventing short circuiting from occurring in each of the respective switching legs due to simultaneous turn-on operations of the positive-side and negative-side semiconductor switching elements commonly included therein, so as to achieve zero-voltage switching which causes each of these semiconductor switching elements to perform a turn-on operation at zero voltage. The short-circuit prevention period Td for the primary-side converter is set so as to prevent occurrence of short-circuiting of the snubber capacitor connected to the semiconductor switching element, due to the turn-on operation of that semiconductor switching element. The short-circuit prevention period Td for either one of the primary-side and secondary-side converters is set to have a relationship with a current-polarity reversal time Tcmtt so that Td≤Tcmtt is satisfied, said current-polarity reversal time Tcmtt being a period of time, when that converter executes a power-transferring operation, from a start time of said short-circuit prevention period Td until a polarity of an AC current flowing through the inductance element is reversed.

Effect of the Invention

In the power conversion device according to the invention, with attention focused in a creative manner on a fact that the length of the short-circuit prevention time determines whether zero-voltage switching is achieved or not, the short-circuit prevention time is adequately set in the above manner. Thus, the power conversion device can surely achieve zero-voltage switching, to thereby convert DC power to other DC power with a low loss.

BRIEF DESCRIPTION OF TEE DRAWINGS

MODES FOR CARRYING OUT THE INVENTION

Embodiment 1

Figure 1:
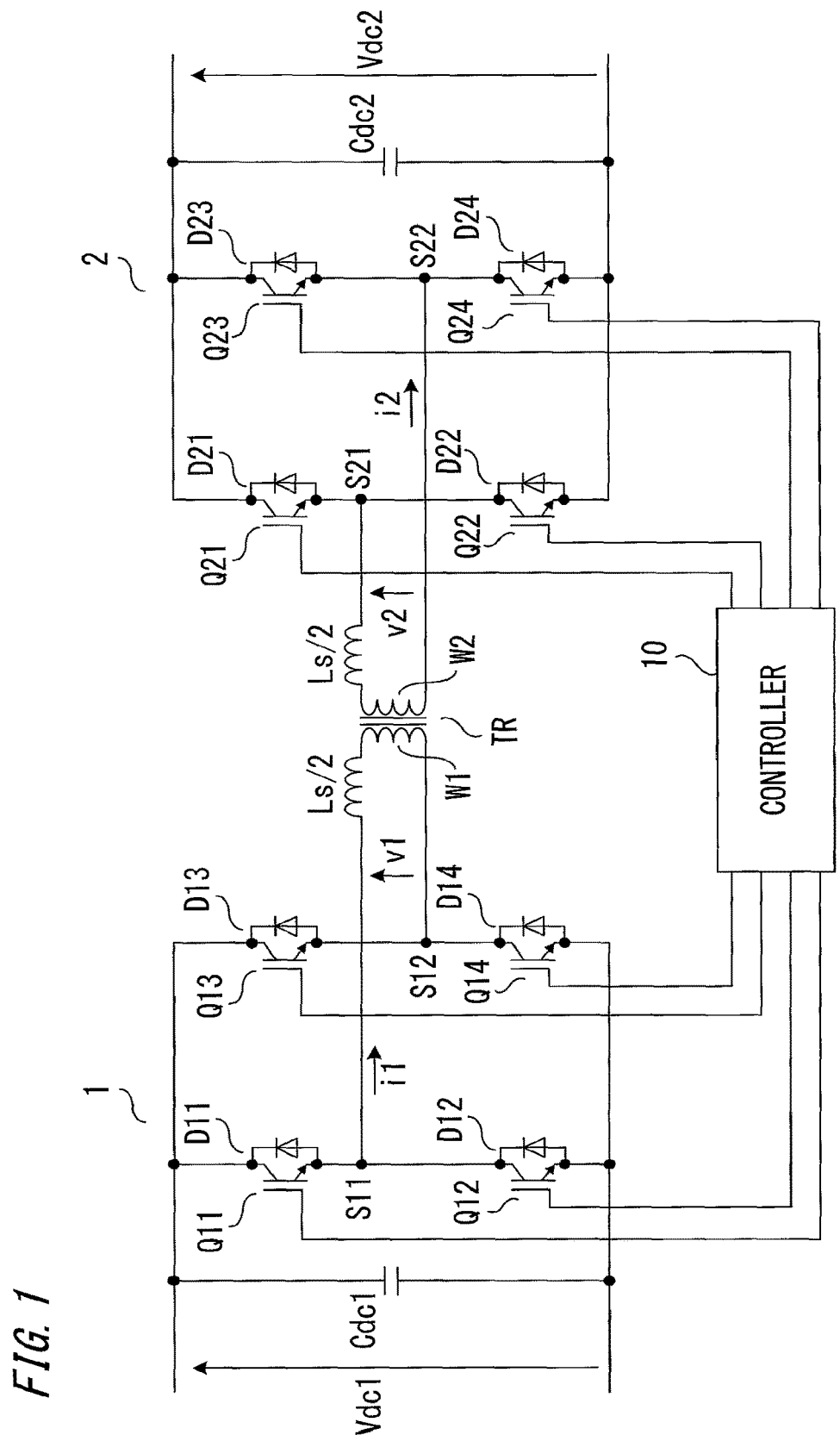
FIG. 1 is a diagram showing an entire configuration of a power conversion device according to Embodiment 1 of the invention.

FIG. 1 is a diagram showing an entire configuration of a power conversion device according to Embodiment 1 of the invention. This power conversion device includes: a main circuit which has two converters 1, 2 placed in a primary-side and a secondary-side and each configured as a single-phase full bridge, and one single-phase transformer TR; and a control device 10; and serves to convert DC power of a primary-side capacitor Cdc1 to which a primary-side DC voltage Vdc1 is applied, to DC power of a secondary-side capacitor Cdc2 to which a secondary-side DC voltage Vdc2 is applied, through the transformer TR. FIG. 1 is just an example, and any product may fall within the applicable scope of this invention so far as it converts DC power to other DC power by using a bridge comprising semiconductor switching elements Q.

For description's sake, it is assumed that one of the sides sandwiching the transformer TR, where the capacitor Cdc1 is placed, is the primary side, and the other side, where the capacitor Cdc2 is placed, is the secondary side. Note that, the circuit in FIG. 1 allows power conversion in which electric power is transmitted and received between the primary side and the secondary side in an unrestricted manner, so that the direction of the power can be controlled without restrictions.

In the primary-side converter 1, a positive-side semiconductor switching element Q11 and a negative-side semiconductor switching element Q12 paired with freewheel diodes D11, D12 connected, respectively, in reverse parallel thereto, are serially connected to each other to form a switching leg S11. Both ends of the switching leg S11 are connected to the capacitor Cdc1. An intermediate connection point of the switching leg S11 is connected to one of AC terminals of a primary-side winding W1 in the transformer TR.

Note that, here, the semiconductor switching elements Q (Q11-Q14, Q21-Q24) and freewheel diodes D (D11-D14, D21-D24) constitute together the respective semiconductor elements described in Claim 1 of the present application.

An inductance Ls in FIG. 1 given as the inductance element indicates a leakage inductance of the transformer TR, and Ls/2 is placed equivalently in the primary side and the secondary side. Note that it is not necessarily required to use only the leakage inductance of the transformer TR as the inductance Ls and an additional inductance may be connected thereto.

Likewise, using the semiconductor switching elements Q13, Q14 and the freewheel diodes D13, D14, a second switching leg S12 is formed, both ends of which is connected to the capacitor Cdc1, and an intermediate connection point of which is connected to the other one of the AC terminals of the primary-side winding W1 in the transformer TR.

The primary-side converter 1 in FIG. 1 uses two switching legs S11, S12, so that it is generally called "single-phase full-bridge circuit", "H bridge circuit" or the like.

On the other hand, in the secondary-side converter 2, using the semiconductor switching elements Q21, Q22, Q23, Q24 paired with the freewheel diodes D21, D22, D23, D24 connected, respectively, in reverse parallel thereto, a single-phase full-bridge circuit with two switching legs S21, S22 is formed, like in the primary side. To the DC side of the converter 2, a capacitor Cdc2 is connected, and to its AC side, AC terminals of a secondary-side winding W2 in the transformer TR are connected.

The circuit in FIG. 1 is a circuit which converts a DC voltage to an AC voltage and thereafter, converts the AC voltage to a DC voltage while ensuring insulation by way of the transformer TR. Note that, when insulation is not required, only an inductance that is equivalent to La may be connected as the inductance element.

In FIG. 1, as each of the capacitors Cdc1, Cdc2, an electrolytic capacitor, a film capacitor or the like may be used; however, because a high-frequency current flows through the capacitor Cdc1 or Cdc2, it is better to use a film capacitor. Using a film capacitor makes it possible to prolong the lifetime.

As each of the semiconductor switching elements Q11, Q12, Q13, Q14 and Q21, Q22, Q23, Q24, a semiconductor switching element, such as, an IGBT (Insulated-Gate Bipolar Transistor), a GCT (gate Commutated Turn-off Thyristor), a MOSFET (Metal-Oxide-Semiconductor Field-Effect Transistor) or the like, is used. Note that, as the semiconductor switching element, a plurality of semiconductor switching elements in which these elements are connected in parallel to each other may be used according to the current capacity.

It is preferable that the turn ratio of the transformer TR (a ratio of the number of turns of the primary-side winding W1 to the number of turns of the secondary-side winding W2) be matched to a ratio of the primary-side DC voltage Vdc1 to the secondary-side DC voltage Vdc2. For example, when the primary-side DC voltage is 1 kV and the secondary-side DC voltage is 3 kV, the turn ratio of the transformer TR is determined as 1:3. Note that, in the following description, the secondary-side DC voltage Vdc2 is assumed to be a voltage converted correspondingly from the primary-side voltage by using the turn ratio of the transformer TR.

The control device 10 can control power P transmitted/received between the primary side and the secondary side, by sending driving signals to the semiconductor switching elements Q1, Q12, Q13, Q14 and Q21, Q22, Q23, Q24 to thereby control turning-on/off of them.

Figure 2:
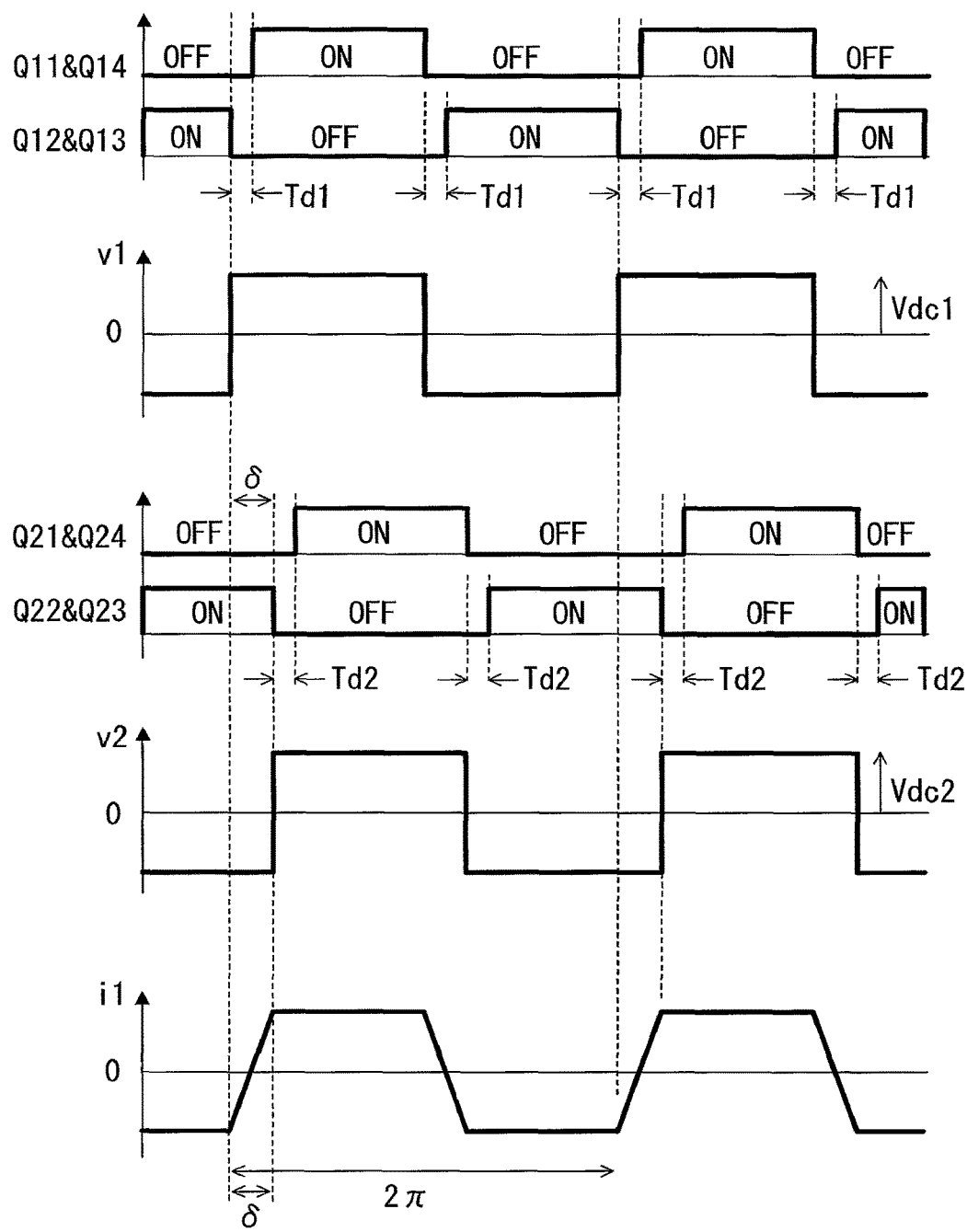
FIG. 2 is a timing chart showing switching operations of respective semiconductor switching elements in the power conversion device in FIG. 1.

FIG. 2 is a timing chart showing operations at respective portions under control of the control device 10, in which shown are respective on/off states of the semiconductor switching elements Q11, Q12, Q13, Q14 and Q21, Q22, Q23, Q24, and output voltages v1, v2 of the primary-side and secondary-side converters 1, 2, and further, a primary-side output current i1.

In the primary-side converter 1, the semiconductor switching elements Q11 and Q14 operate in mutually the same switching state, and the semiconductor switching elements Q12 and Q13 operate in mutually the same switching state.

The semiconductor switching elements Q11, Q14 are not turned on simultaneously with the semiconductor switching elements Q12, Q13; these switching elements are each turned on and turned off, ideally, in respective 180 degrees per one cycle (360 degrees), and the semiconductor switching elements Q11, Q14 and the semiconductor switching elements Q12, Q13 perform mutually inverted operations.

It is noted that, at the time the semiconductor switching element changes from "turned-off" to "turned-on", in order to prevent short circuiting from occurring in the DC-side capacitor due to variation in the characteristic of the semiconductor switching element, variation in the control characteristic, or the like, a short-circuit prevention period (referred to, also as dead time, in this application) Td1 is inserted. The dead time means a period where the semiconductor switching elements Q11, Q12 are both turned off (or Q13, Q14 are both turned off).

On the other hand, also in the secondary-side converter 2, like in the primary-side converter 1, the semiconductor switching elements Q21 and Q24 operate in mutually the same switching state, and the semiconductor switching elements Q22 and Q23 operate in mutually the same switching state.

Further, a dead time Td2 where the semiconductor switching elements Q21, Q22 are both turned off (or Q23, Q24 are both turned off) is inserted.

Switching in the primary-side converter 1 and the secondary-side converter 2 is executed in their phases shifted by a phase difference δ [rad] therebetween. In the period of this phase difference δ, the output current i1 of the primary-side converter 1 changes to provide a current waveform as shown in FIG. 2. Namely, controlling the output current i1 by using the phase difference δ makes it possible to control the power P.

Here, the power P transmitted from the primary side to the secondary side is represented by a following formula (1) (see, for example, the formula (12) described at p. 67 in Non-Patent Document 1).

[Mathematical 1]

$$P = \frac{Vdc1 \cdot Vdc2}{\omega Ls}\left(\delta - \frac{\delta^2}{\pi}\right) \quad (1)$$

It is noted that ω denotes a value resulting from multiplying a switching frequency fs by 2π.

Next, zero-voltage switching (ZVS) which is a feature of Embodiment 1 will be described.

Figure 3:
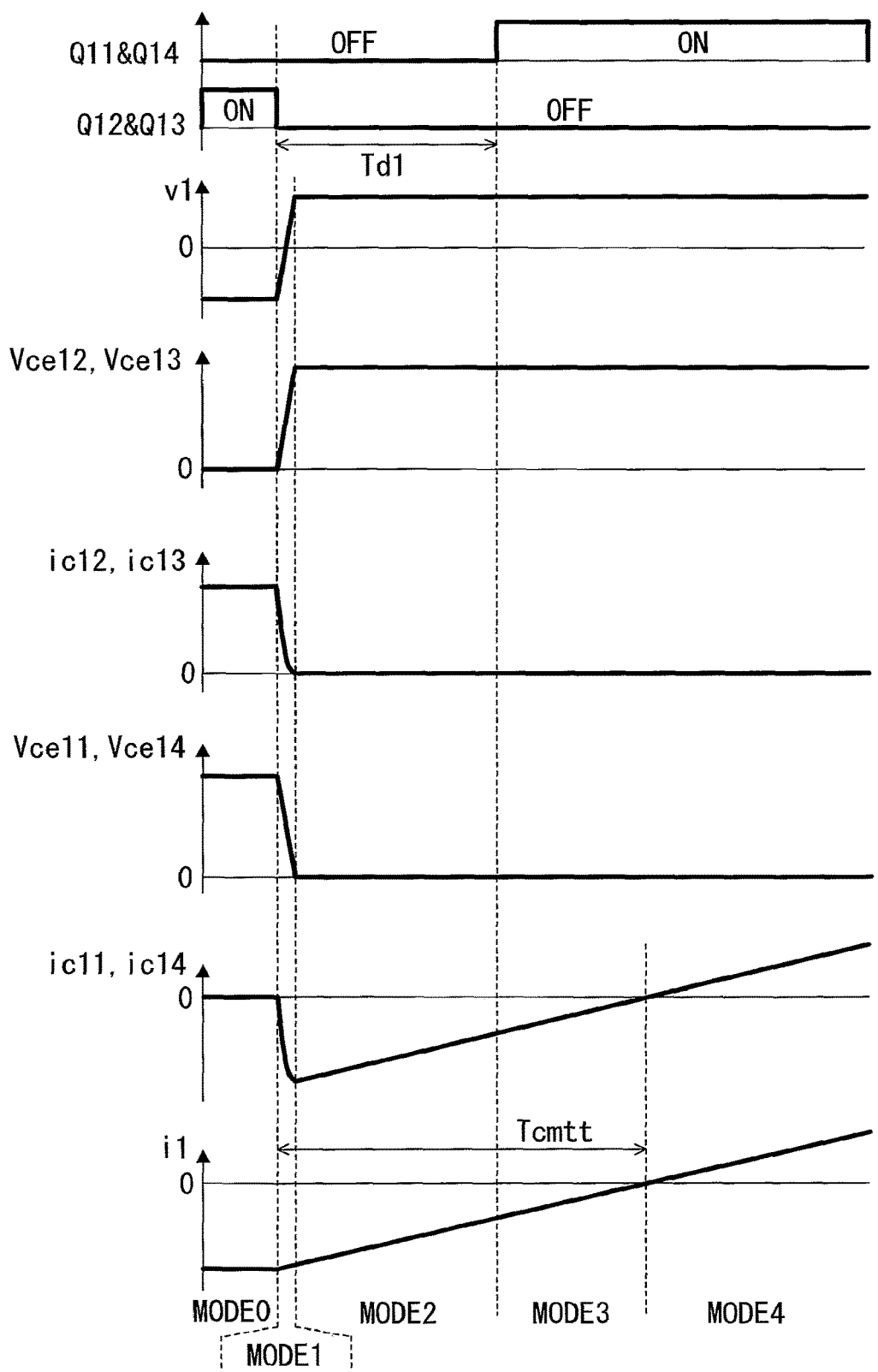
FIG. 3 is a timing chart showing changes in voltages and currents at respective portions when attention is focused, in particular, on switching operations in a power-transferring side converter, according to Embodiment 1 of the invention.

FIG. 3 is a timing chart showing switching operations in the primary-side converter 1 (as described later, herein serving as a power-transferring side converter), in which, attention is paid on an event where the switching states in the primary-side converter 1 change, and there are specifically shown: switching states of the semiconductor switching elements Q11, Q12, Q13, Q14; the output voltage v1; voltages Vce12, Vce13 across the respective semiconductor switching elements Q12, Q13; currents ic12, ic13 flowing through the semiconductor switching elements Q12, Q13 or the freewheel diodes D12, D13, respectively (when positive, currents flowing through the semiconductor switching elements; when negative, currents flowing through the freewheel diodes); voltages Vce11, Vce14 across the respective semiconductor switching elements Q11, Q14; currents ic11, ic14 flowing through the semiconductor switching elements Q11, Q14 or the freewheel diodes D11, D14, respectively (when positive, currents flowing through the semiconductor switching elements; when negative, currents flowing through the freewheel diodes); and the output current i1 of the primary-side converter 1.

In FIG. 2, a state where the power is transmitted from the primary side toward the secondary side is shown. Accordingly, in FIG. 3, illustration is made focusing attention on the switching operations in the power-transferring side converter 1.

Figure 4:
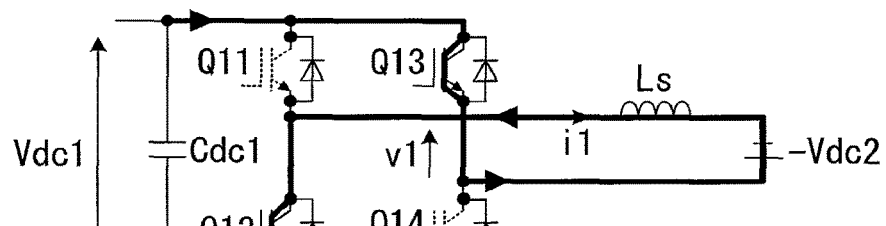
FIG. 4 is a circuit diagram showing a current flowing state in each MODE shown in FIG. 3.
Figure 4:
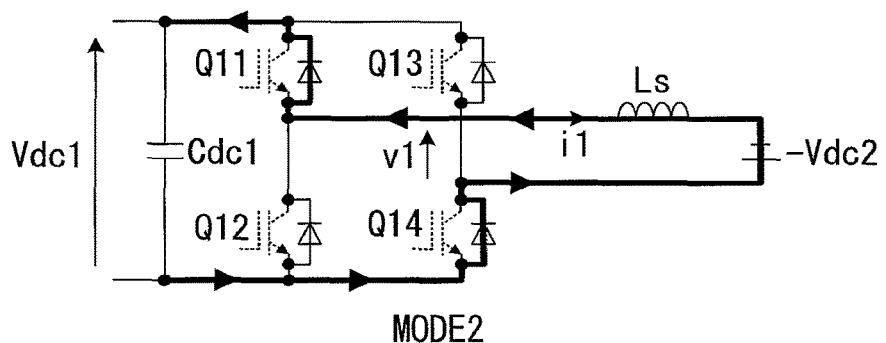
Figure 4:
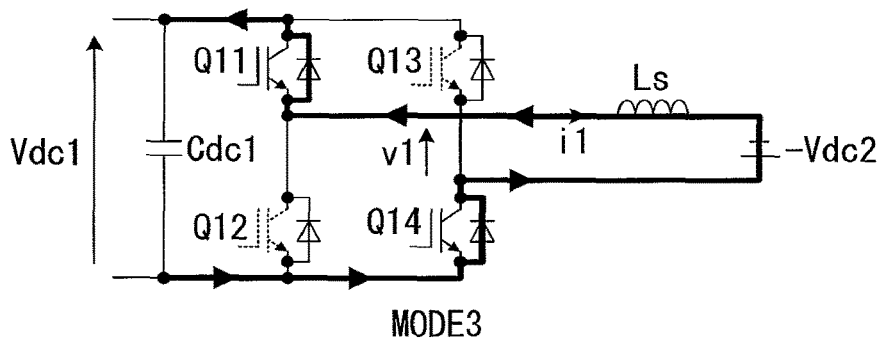
Figure 4:
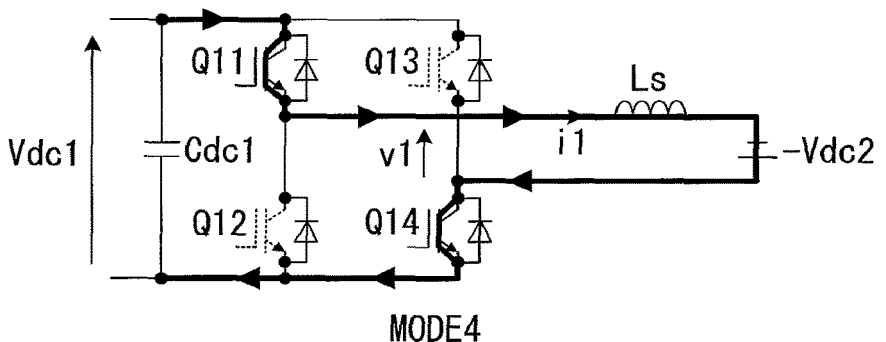

Further, the phenomena shown in FIG. 3 can be described in a manner divided to MODE0 to MODE4, together with FIG. 4 in which current flowing states are shown. Note that in FIG. 4, the leakage inductance is totally indicated by Ls, and the output voltage of the secondary-side converter 2 is simulated to be Vdc2.

In FIG. 3 and FIG. 4, in MODE0 as an initial state, the semiconductor switching elements Q1, Q14 are in turned-off states, and the semiconductor switching elements Q12, Q13 are in turned-on states.

In MODE1 that follows these states, the semiconductor switching elements Q12, Q13 change from "turned-on" to "turned-off" while the semiconductor switching elements Q11, Q14 are kept turned-off without change. Accordingly, the voltages Vce12, Vce13 across the semiconductor switching elements Q12, Q13 increase from zero to Vdc1, while the voltages Vce11, Vce14 across the semiconductor switching elements Q11, Q14 decrease from Vdc1 to zero. Further, the currents ic12, ic13 decrease from values in current-flowing states to zero, while the currents ic11, ic14 increase from zero to reach the currents equivalent to the output current i1. On this occasion, the currents are commutated from the semiconductor switching elements Q12, Q13 to the freewheel diodes D11, D14, thus causing turn-off losses in the semiconductor switching elements Q12, Q13.

It is noted that MODE1 is omitted from illustration in FIG. 4, because the current-flows in that mode vary largely in a extremely short time and is thus difficult to be illustrated, even though the occurrence of the current commutation can not be avoided in Embodiment 1.

In the following MODE2, the switching states in MODE1 are maintained. The output current i1 is negative in polarity and its magnitude decreases gradually.

In the following MODE3, the semiconductor switching elements Q11, Q14 change from "turned-off" to "turned-on". The semiconductor switching elements Q12, Q13 are kept turned-off. At this time, because the polarity of the output current i1 is negative, currents are already flowing through the freewheel diodes D11, D14. Namely, in this state, even when the semiconductor switching elements Q11, Q14 change from "turned-off" to "turned-on", the respective voltages Vce11, Vce14 across them do not change, causing no turn-on loss. This phenomenon is called zero-voltage switching (ZVS), by which a switching loss can be reduced.

In the following MODE4, the output current i1 changes from negative to positive. On this occasion, the currents having been flowing through the freewheel diodes D11, D14 flow instead through the semiconductor switching elements Q11, Q14.

In order to achieve zero-voltage switching which is one of the features of Embodiment 1, the length of the dead time Td1 for the power-transferring side converter 1 is set as follows. Namely, in FIG. 3, the illustration has been made assuming that, relative to the dead time Td1, a current-polarity reversal time Tcmtt is longer that is a period of time from a start time of the dead time Td1 until the polarity of the output current i1 (an AC current flowing through the inductance Ls) is reversed.

As a comparative example, such a case where the time Tcmtt until the polarity of the output current i1 is reversed, is shorter than the dead time Td1, will be described, using FIG. 5, as follows. In the case where the time Tcmtt until the polarity of the output current i1 is reversed is shorter than the dead time Td1, namely, when the polarity of the output current i1 is reversed in a state where the period of aforementioned MODE2 has started and thus all of the semiconductor switching elements are turned off, the currents flow, not through the freewheel diodes D11, D14 as shown in MODE2 in FIG. 4, but through the freewheel diodes D12, D13 as shown in the upper figure in FIG. 5.

Figure 5:
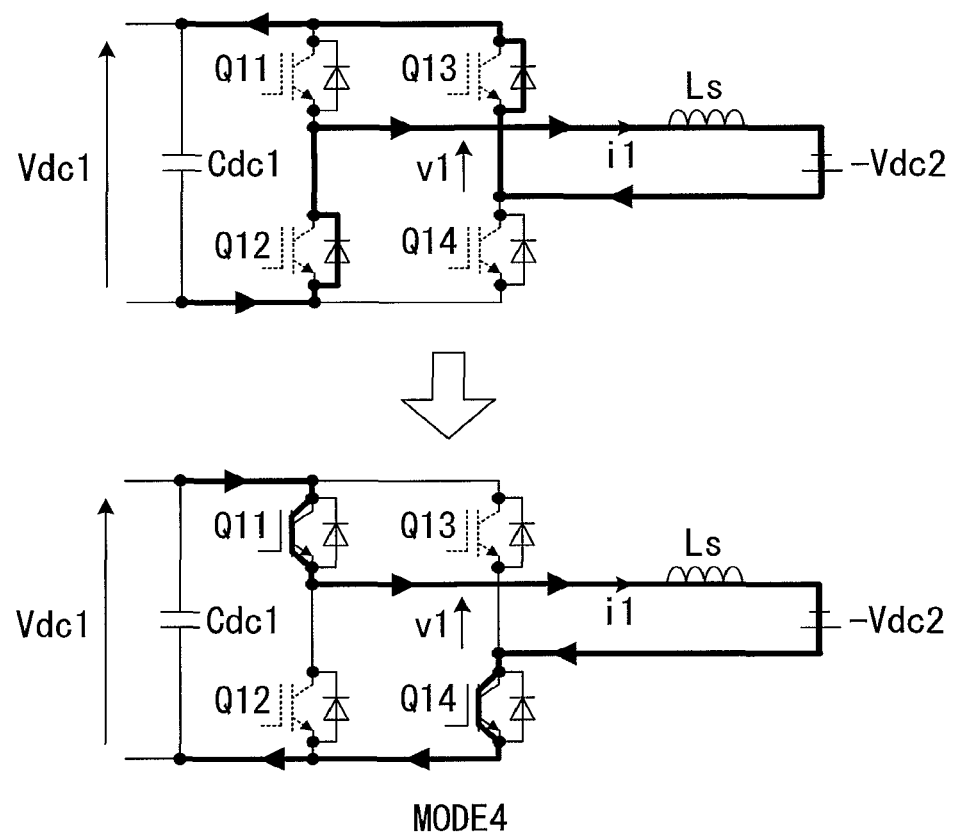
FIG. 5 is a circuit diagram showing current flowing states in a condition where zero-voltage switching is not achieved, in a comparative example with respect to Embodiment 1 of the invention.

Thereafter, when the dead time Td1 is terminated and thus the semiconductor switching elements Q11, Q14 change from "turned-off" to "turned-on", the currents having been flowing through the freewheel diodes D12, D13 are commutated to the semiconductor switching elements Q11, Q14 as shown in the lower figure in FIG. 5, so that recovery losses occur in the freewheel diodes D12, D13 and turn-on losses occur in the semiconductor switching elements Q11, Q14. Namely, zero-voltage switching is not achieved, and this results in increased losses.

In this respect, Embodiment 1 has a feature in that the dead time Td1 for the power-transferring side converter 1 is set equal to or less than the current-polarity reversal time Tcmtt until the polarity of the output current i1 is reversed.

Note that, when such a condition where the output current is zero, and thus the power P is given as zero, is applied to the aforementioned formula (1), the current-polarity reversal time Tcmtt can be calculated in a form of a formula (2) shown below.

[Mathematical 2]

$$Tcmtt = \frac{\pi - \sqrt{\pi^2 - 4\frac{\pi \omega Ls P}{Vdc1 \cdot Vdc2}}}{4\omega} \quad (2)$$

From the above, in the power conversion device of Embodiment 1, the dead time Td1 for the power-transferring side converter 1 is set so that a following formula (3) is satisfied.

[Mathematical 3]

$$Td1 \leq \frac{\pi - \sqrt{\pi^2 - 4\frac{\pi \omega Ls P}{Vdc1 \cdot Vdc2}}}{4\omega} \quad (3)$$

It is noted that, when the dead time Td1 for the power-transferring side converter 1 is to be set based on the formula (3), a certain degree of flexibility may be considered to determine at what level the transferring power P is to be set.

For example, when the dead time Td1 is set in a condition where the transferring power P is the rated power of the power conversion device, because a facility capacity is determined according to an operating condition where such largest power is handled, it is possible, as a result of reduction in the losses in that operating condition, to reduce a required capacity of a cooler, for example, to thereby achieve downsizing thereof.

In contrast, when the dead time is set according to an average value of the transferring power P under actual operations, the losses can be reduced in operating states over a long period of time, and this will result in improvement in the efficiency of the power-transferring. For example, in the case where the power conversion device is used for offshore wind power generation or the like, an output of about 40% of the rated value is promising in average. Thus, in that case, it suffices to determine the dead time Td1 in a condition with 40% of the rated power of the power conversion device.

Next, description will be made about operations when attention is focused on the receiving-side converter 2 (here, corresponding to the single-phase full-bridge circuit in the secondary side).

Figure 6:
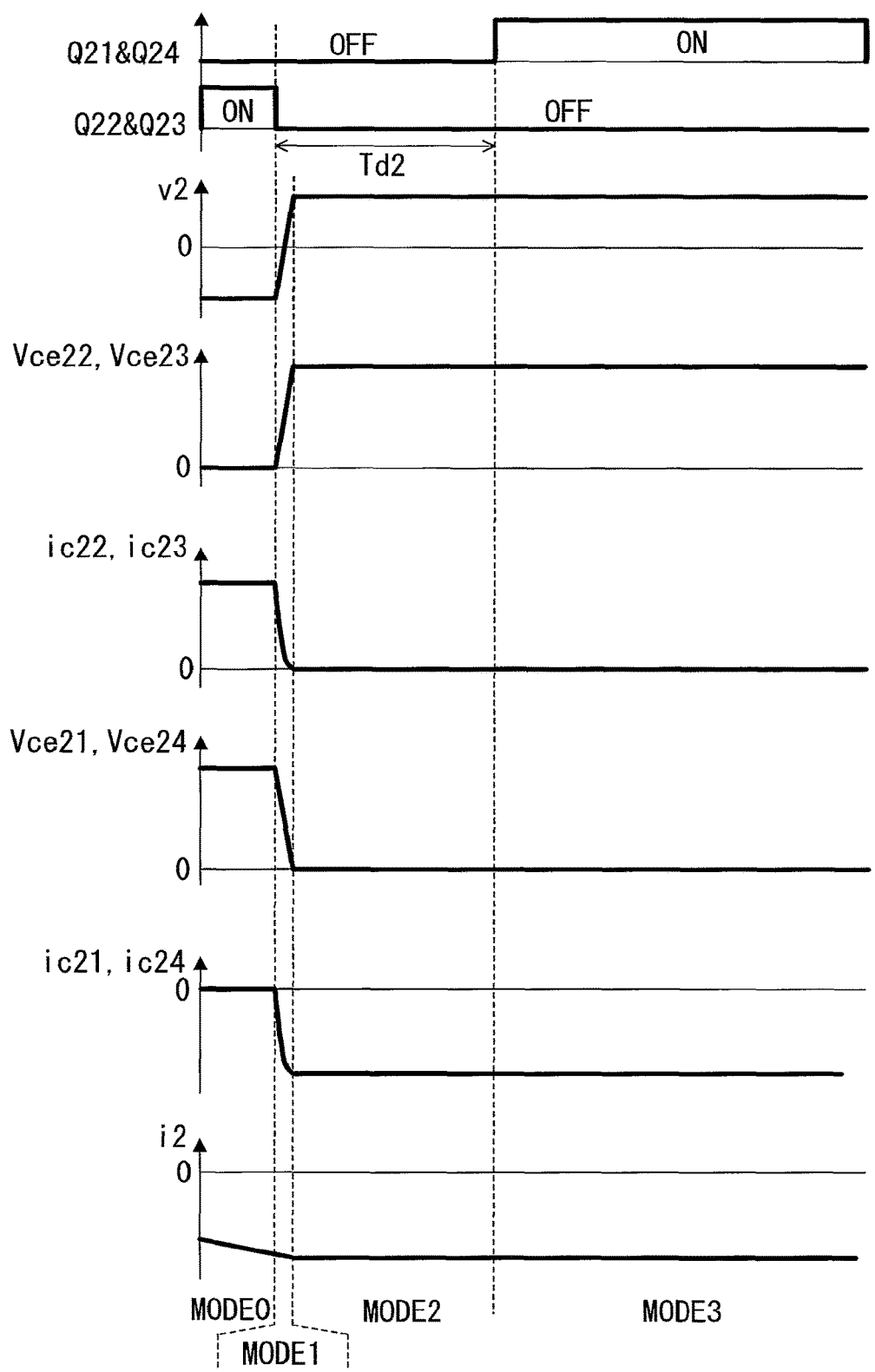
FIG. 6 is a timing chart showing changes in voltages and currents at respective portions when attention is focused, in particular, on switching operations in a power-receiving side converter, according to Embodiment 1 of the invention.

FIG. 6 is a timing chart showing switching operations in the power-receiving side (secondary-side) converter 2, in which, attention is paid on an event where the switching states in the secondary-side converter 2 change, and there are specifically shown: switching states of the semiconductor switching elements Q21, Q22, Q23, Q24; the output voltage v2; voltages Vce22, Vce23 across the respective semiconductor switching elements Q22, Q23; currents ic22, ic23 flowing through the semiconductor switching elements Q22, Q23 or the freewheel diodes D22, D23, respectively (when positive, currents flowing through the semiconductor switching elements; when negative, currents flowing through the freewheel diodes); voltages Vce21, Vce24 across the respective semiconductor switching elements Q21, Q24; currents ic21, ic24 flowing through the semiconductor switching elements Q21, Q24 or the freewheel diodes D21, D24, respectively (when positive, currents flowing through the semiconductor switching elements; when negative, currents flowing through the freewheel diodes); and the output current i2 of the secondary-side converter 2.

Figure 7:
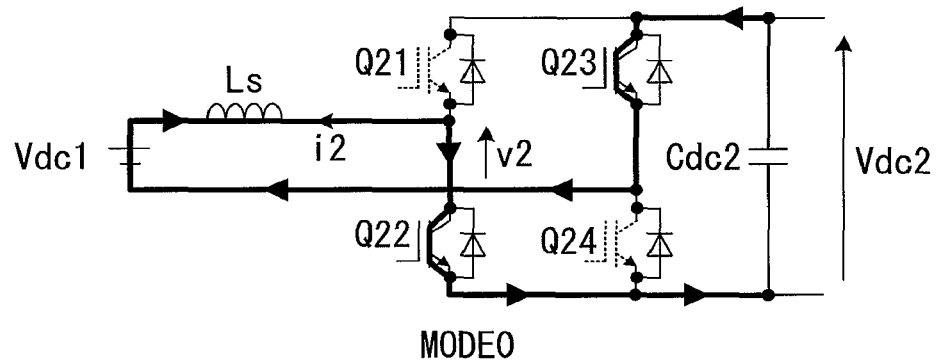
FIG. 7 is a circuit diagram showing a current flowing state in each MODE shown in FIG. 6.
Figure 7:
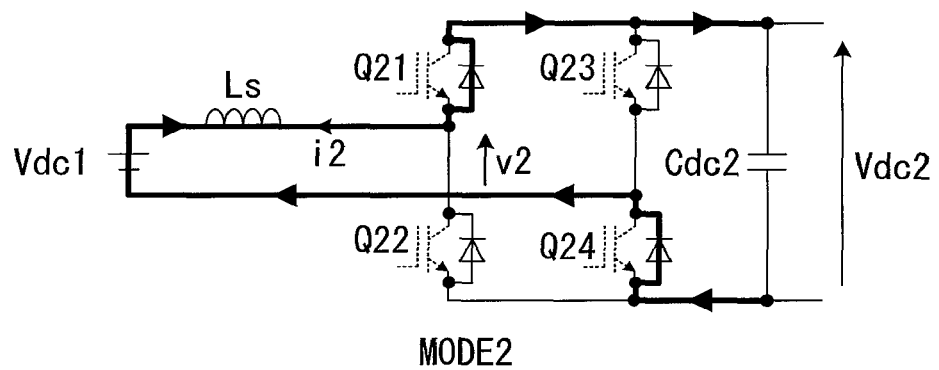
Figure 7:
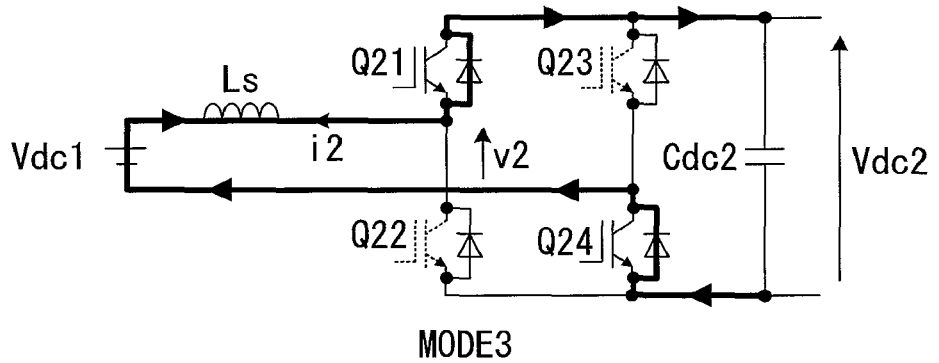

The phenomena shown in FIG. 6 can be described in a manner divided to MODE0 to MODE3, together with FIG. 7 in which current flowing states are shown. Note that in FIG. 7, the leakage inductance is totally indicated by Ls, and the output voltage of the primary-side converter 1 is simulated to be Vdc1.

In FIG. 6 and FIG. 7, in MODE0 as an initial state, the semiconductor switching elements Q21, Q24 are in turned-off states, and the semiconductor switching elements Q22, Q23 are in turned-on states.

In MODE1 that follows these states, the semiconductor switching elements Q22, Q23 change from "turned-on" to "turned-off" while the semiconductor switching elements Q21, Q24 are kept turned-off without change. Accordingly, the voltages Vce22, Vce23 across the semiconductor switching elements Q22, Q23 increase from zero to Vdc2, while the voltages Vce21, Vce24 across the semiconductor switching elements Q21, Q24 decrease from Vdc2 to zero. Further, the currents ic22, ic23 decrease from values in current-flowing states to zero, while the currents ic21, ic24 increase from zero to reach the currents equivalent to the output current i2. On this occasion, the currents are commutated from the semiconductor switching elements Q22, Q23 to the freewheel diodes D21, D24, thus causing turn-off losses in the semiconductor switching elements Q22, Q23.

It is noted that MODE1 is omitted from illustration in FIG. 7 for the same reason previously described about FIG. 4 for the aforementioned power-transferring side converter 1.

In the following MODE2, the switching states in MODE1 are maintained. At this time, although the output current i1 varies in MODE2 in the power-transferring side converter 1, the output current i2 does not vary in the power-receiving side converter 2 as shown in FIG. 6.

In the following MODE3, the semiconductor switching elements Q21, Q24 change from "turned-off" to "turned-on". The semiconductor switching elements Q22, Q23 are kept turned-off. At this time, because the polarity of the output current i2 is negative, currents are already flowing through the freewheel diodes D21, D24. Namely, in this state, even when the semiconductor switching elements Q21, Q24 change from "turned-off" to "turned-on", the voltages Vce21, Vce24 across them do not change, causing no turn-on loss. Namely, a switching loss can be reduced by zero-voltage switching (ZVS).

As described above, in the power-receiving side converter 2, MODE4 following MODE3 is not present. Namely, it is a feature that no polarity reversion occurs in the output current i2 just after the change in the switching states. Accordingly, in the power-transferring side converter 1, in order to achieve zero-voltage switching, the dead time Td1 is required to be set short so as to satisfy the aforementioned formula (3), whereas the dead time Td2 for the power-receiving side converter 2 may be set longer because, for that dead time, there is no restriction related to zero-voltage switching.

Thus, although the reliability of the semiconductor switching element generally tends to be lowered when the dead time is set short, when the dead time Td2 for the power-receiving side converter 2 is set longer than the short-set dead time Td1 for the power-transferring side converter 1, for example, the reliability of the device is improved because there is no dead time that is set unnecessarily short.

By the way, in the case where the power conversion device serves to transmit the power always from the primary side to the secondary side, it suffices to set the previously-described respective dead times Td1, Td2 by regarding the primary side as a power-transferring side, and the secondary side as a power-receiving side; however, in some cases, the direction of power flow is reversed in relation to a time period, an amount of the power generation, an amount of the load power, or the like.

In such cases, for example, a control method is conceivable in which either one of the primary-side and secondary-side converters 1, 2 which is under power-transferring operation is regarded as the power-transferring side converter 1(2) while the other one at that time is regarded as the power-receiving side converter 2(1), and then the dead times suited to the respective converters are set. In the case of this method, at every time the direction of power flow changes, it is necessary to change the dead times for both converters 1, 2, thus causing complexity in control accordingly; however, there is an advantage in that zero-voltage switching is achieved in both converters 1, 2 regardless of the direction of power flow, so that a low-loss and highly-efficient operating characteristic is obtained.

In contrast, another control method is conceivable in which the primary-side or secondary-side converter 1(2) whose average operation time for power-transferring is, in a specific period of time, for example, in a day, longer than its average operation time for power-receiving, is regarded as the power-transferring side converter 1(2) while the other one is regarded as the power-receiving side converter 2(1), and then the dead times suited to the respective converters are set. In the case of this method, there is a drawback in that, in a period of time where the direction of the power that was a basis for determining the power-transferring side and the power-receiving side is reversed, even though it is a relatively short period of time below the average time, a situation may arise in which zero-voltage switching is not achieved.

Notwithstanding, like in a case where the direction of the power is unchanged, there is an advantage in that the control related to the setting of the dead times for both converters 1, 2 becomes simplified and easy.

It is further noted that, as the withstand voltage of the semiconductor switching element becomes higher, the change in gate voltage becomes more moderate, and thus a longer dead time has to be ensured. Accordingly, among the cases described above, in the case where the direction of the power-transferring in the power conversion device is unchanged or the power-transferring side and power-receiving side converters 1, 2 are determined according to the lengths of the average operation times for power-transferring and power-receiving, a following configuration may be employed.

Namely, when the power-transferring side is herein regarded as the primary side, the rated voltage of the secondary-side semiconductor element (the switching element and the diode) is set higher than the rated voltage of the primary-side semiconductor element in such a manner that, in the transformer TR in FIG. 1, the number of turns of the secondary-side winding W2 is made larger than the number of turns of the primary-side winding W1, to thereby establish a configuration which can perform boosting operation from a lower voltage to a higher voltage.

This makes it possible, by setting the dead time for the power-transferring side converter 1 to be short and the dead time for the power-receiving side converter 2 to be long, to achieve zero-voltage switching to thereby provide a low-loss power conversion device, without affecting the reliability of the semiconductor element.

Such a way for use is best suited to an DC/DC conversion application for performing boosting from a source of low-voltage energy, for example, renewable energy, etc. toward a high-voltage power system or load.

It is noted that, in the above, the description has been made assuming that the semiconductor switching elements are used also in the power-receiving side converter 2; however, the power-receiving side converter 2 may be provided with the diodes only, without using the semiconductor switching elements. In that case, it is possible to achieve simplification with respect to the semiconductor switching elements, to thereby downsize the power conversion device.

In that case, it is noted with respect to "semiconductor elements" described in Claim 1 of this application, that the semiconductor elements in the primary-side/power-transferring side converter 1 are each configured with the semiconductor switching element and the freewheel diode, while the semiconductor elements in the secondary-side/power-receiving side converter 2 are each configured with the diode only, without including the semiconductor switching element.

As described above, in the power conversion device according to Embodiment 1 of the invention, the dead time Td1 for the converter 1 serving as the power-transferring side converter is set equal to or less than the current-polarity reversal time Tcmtt. Thus, it is possible to surely achieve zero-voltage switching, to thereby provide a low-loss power conversion device.

Further, when the rated voltage of the semiconductor element in the power-receiving side converter 2 is set higher than the rated voltage of the semiconductor element in the power-transferring side converter 1 to thereby establish a configuration which can perform boosting operation from a lower voltage to a higher voltage, and in addition, the dead time for the power-transferring side converter 1 is set to be short and the dead time for the power-receiving side converter 2 is set to be long, it is possible to achieve zero-voltage switching to thereby provide a low-loss power conversion device, without affecting the reliability of the semiconductor element.

Embodiment 2

Figure 8:
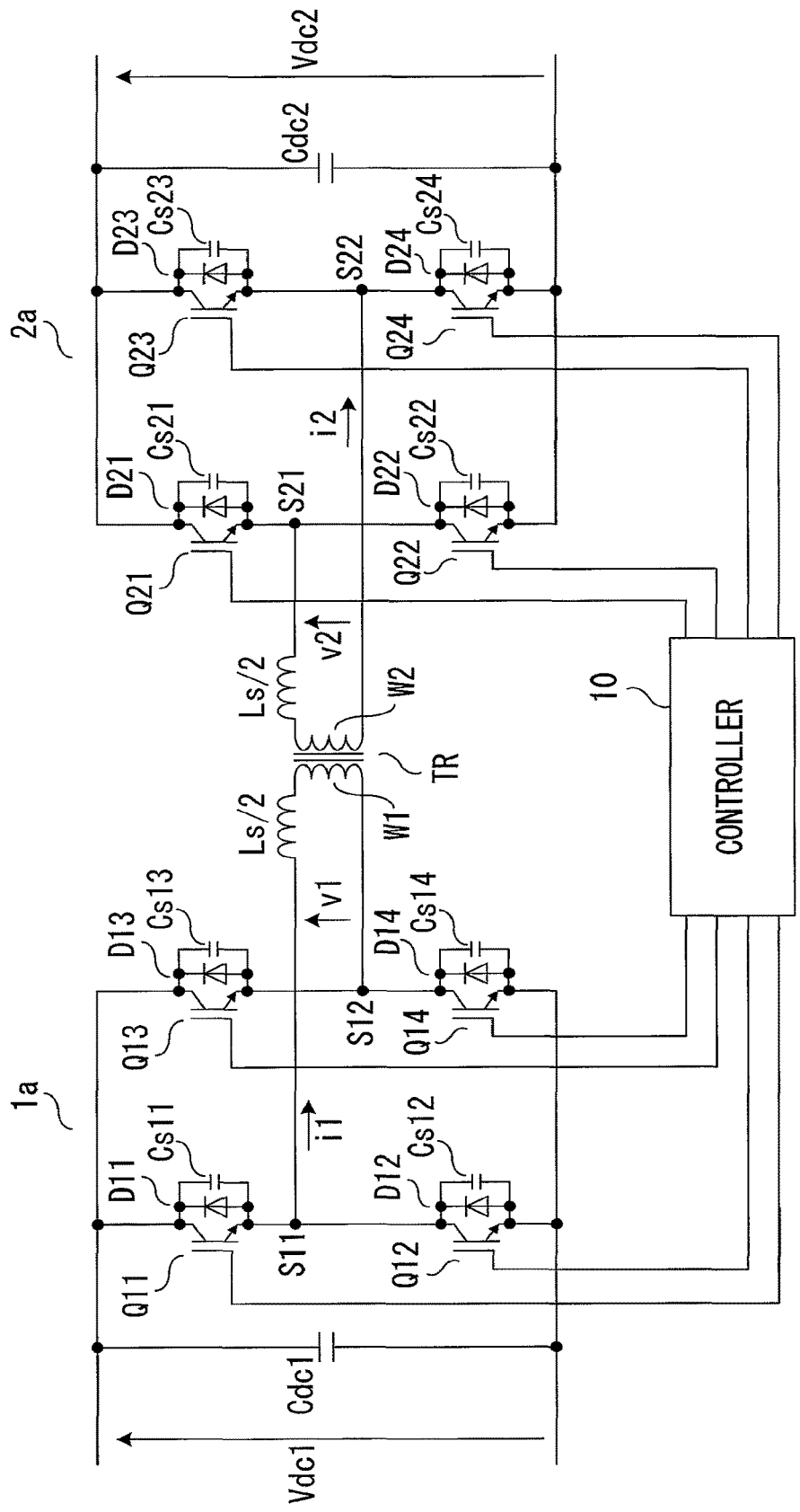
FIG. 8 is a diagram showing an entire configuration of a power conversion device according to Embodiment 2 of the invention.

FIG. 8 is a diagram showing an entire configuration of a power conversion device according to Embodiment 2 of the invention. As shown in FIG. 8, the power conversion device includes: a main circuit which has two converters 1a, 2a placed in a primary-side and a secondary-side and each configured as a single-phase full bridge, and one single-phase transformer TR; and a control device 10. Here, snubber capacitors Cs11, Cs12, Cs13, Cs14, Cs21, Cs22, Cs23, Cs24 are connected, respectively, in parallel to the semiconductor switching elements Q11, Q12, Q13, Q14, Q21, Q22, Q23, Q24 and the freewheel diodes D11, D12, D13, D14, D21, D22, D23, D24 that have been described using FIG. 1.

Connection of the snubber capacitor makes it possible to moderate the change in voltage at the time of turning-off, to thereby create an effect of reducing the turn-off loss and noise.

It is noted that, other than the connection of the snubber capacitors, the circuit configuration is equivalent to that in FIG. 1 of aforementioned Embodiment 1, so that its detailed description is omitted here. Even when the snubber capacitors are connected, it is possible to control the transferring power P, by turning-on/off the semiconductor switching elements in a manner similar to that described using FIG. 2 or the like.

Figure 9:
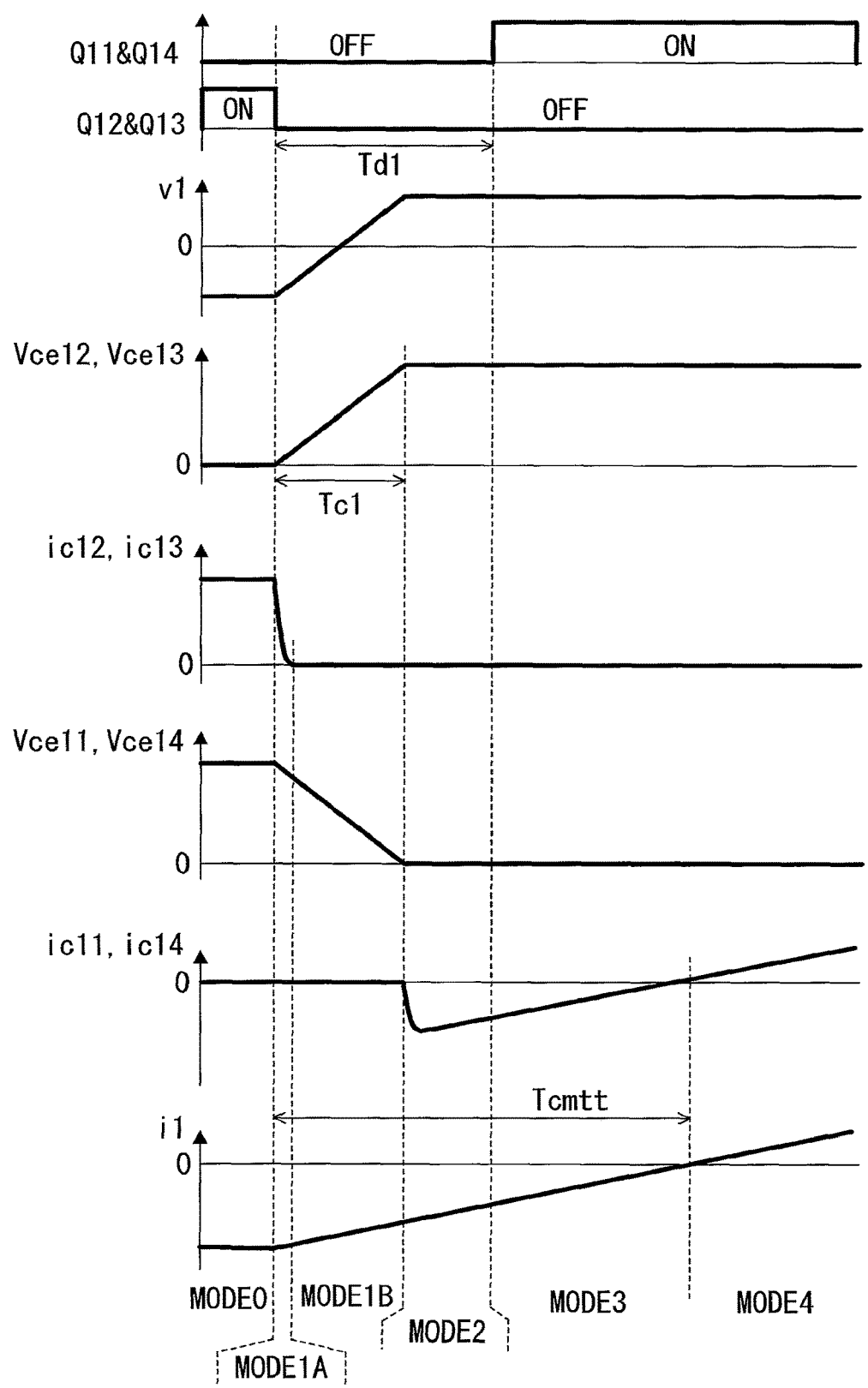
FIG. 9 is a timing chart showing changes in voltages and currents at respective portions when attention is focused, in particular, on switching operations in a power-transferring side converter, according to Embodiment 2 of the invention.

FIG. 9 is a timing chart showing switching operations in the primary-side (herein provided as the power-transferring side) converter 1a, in which, attention is paid on an event where the switching states in the primary-side converter 1a change, and there are specifically shown: switching states of the semiconductor switching elements Q11, Q12, Q13, Q14; the output voltage v1; voltages Vce12, Vce13 across the respective semiconductor switching elements Q12, Q13; currents ic12, ic13 flowing through the semiconductor switching elements Q12, Q13 or the freewheel diodes D12, D13, respectively (when positive, currents flowing through the semiconductor switching elements; when negative, currents flowing through the freewheel diodes); voltages Vce11, Vce14 across the respective semiconductor switching elements Q11, Q14; currents ic11, ic14 flowing through the semiconductor switching elements Q11, Q14 or the freewheel diodes D11, D14, respectively (when positive, currents flowing through the semiconductor switching elements; when negative, currents flowing through the freewheel diodes); and the output current i1 of the primary-side converter 1a.

Figure 10:
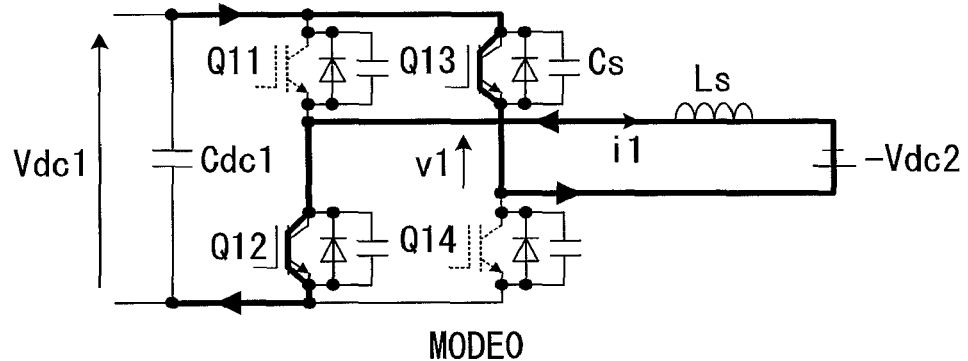
FIG. 10 is a circuit diagram showing a current flowing state in each of MODEs shown in FIG. 9.
Figure 10:
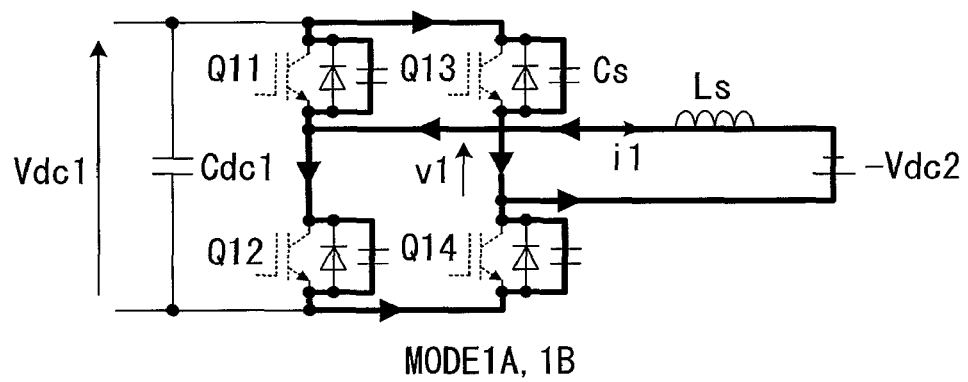
Figure 10:
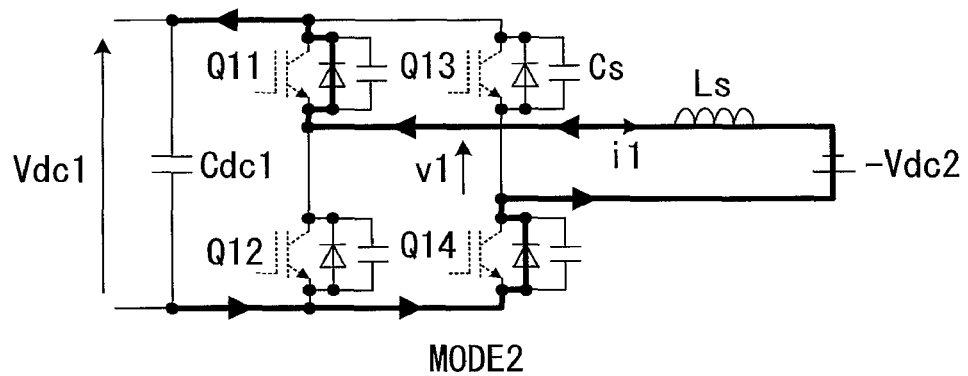
Figure 11:
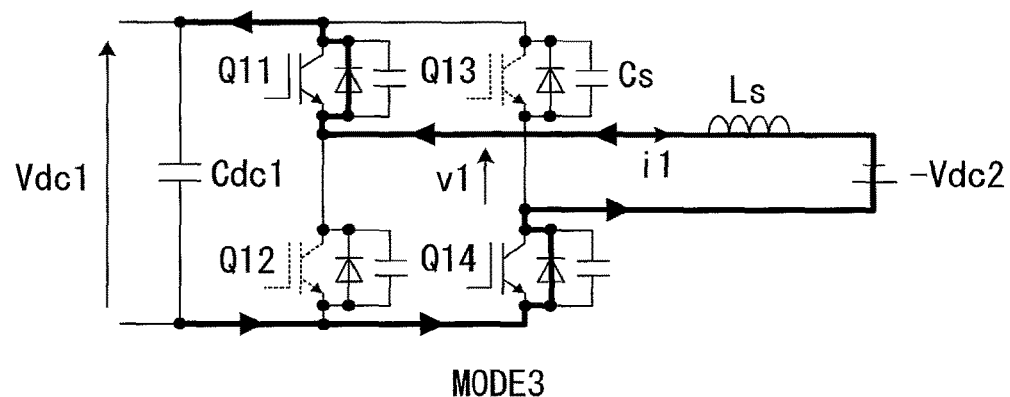
FIG. 11 is a circuit diagram showing a current flowing state in each of other MODEs shown in FIG. 9.
Figure 11:
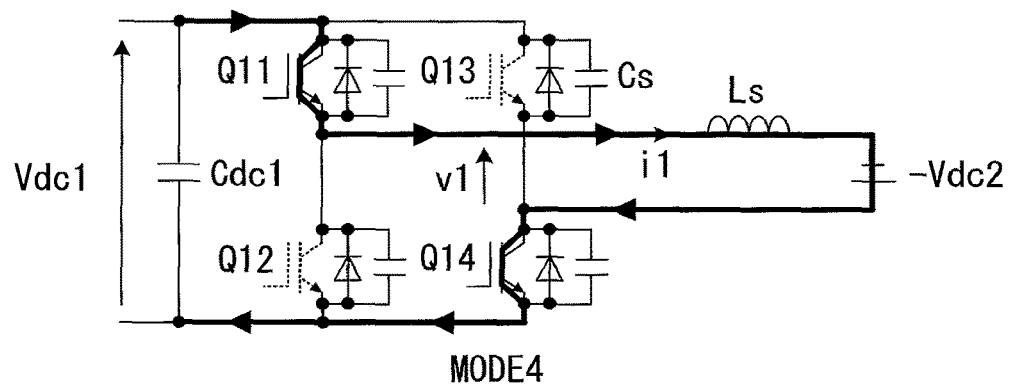

Further, the phenomena shown in FIG. 9 can be described in a manner divided to MODE0 to MODE4, together with FIG. 10 and FIG. 11 in which current flowing states are shown. Note that in FIG. 10 and FIG. 1l, the leakage inductance is totally indicated by Ls, and the output voltage of the secondary-side converter 2a is simulated to be Vdc2.

In FIG. 9, FIG. 10 and FIG. 11, in MODE0 as an initial state, the semiconductor switching elements Q1, Q14 are in turned-off states, and the semiconductor switching elements Q12, Q13 are in turned-on states.

In MODE1A that follows these states, the semiconductor switching elements Q12, Q13 change from "turned-on" to "turned-off" while the semiconductor switching elements Q11, Q14 are kept turned-off without change. However, although the currents flowing through the semiconductor switching elements Q12, Q13 can be shut off immediately, the voltages Vce12, Vce13 across them increase moderately due to influence by the snubber capacitors Cs12, Cs13.

Since the turn-off loss is derived from multiplication of a voltage by a current at the time of such change, in comparison to the case where no snubber capacitor is connected, it is possible to reduce the turn-off loss because the current is shut off in a state with a lower voltage.

In the following MODE1B, the snubber capacitors Cs12, Cs13 continue to be charged, and at the same time, the snubber capacitors Cs11, Cs14 continue to be discharged. As final values in MODE1B, the voltages Vce12, Vce13 reach Vdc1, and the voltage Vce11, Vce14 become nearly zero.

Note that the snubber capacitors Cs11, Cs12, Cs13, Cs14 are those having capacitances that allow charging of the snubber capacitors Cs12, Cs13 and discharging of the snubber capacitors Cs11, Cs14 to be completed at a time before the time at which switching occurs from MODE3 to MODE4 that are to be described later, namely, before the time at which the output current i1 changes from negative to positive.

In the following MODE2, the switching states in MODE1B are maintained. The output current i1 is negative in polarity and its magnitude decreases gradually.

In the following MODE3, the semiconductor switching elements Q11, Q14 change from "turned-off" to "turned-on". The semiconductor switching elements Q12, Q13 are kept turned-off. At this time, because the polarity of the output current i1 is negative, currents are already flowing through the freewheel diodes D11, D14. Namely, in this state, even when the semiconductor switching elements Q11, Q14 change from "turned-off" to "turned-on", the respective voltages Vce11, Vce14 across them do not change, causing no turn-on loss. Namely, zero-voltage switching is achieved, so that a switching loss can be reduced.

Here, the basis for achieving zero-voltage switching resides in that the dead time Td1 is set as described by the formula (3) in Embodiment 1, namely, it is set equal to or less than the current-polarity reversal time Tcmtt.

In the following MODE4, the output current i1 changes from negative to positive. On this occasion, the currents having been flowing through the freewheel diodes D11, D14 flow instead through the semiconductor switching elements Q11, Q14.

In the above description, a large difference from Embodiment 1 resides in MODE1A and MODE1B. Namely, when the snubber capacitors Cs11, Cs12, Cs13, Cs14 are connected, the snubber capacitors Cs12, Cs13 connected in parallel to the turned-off semiconductor switching elements Q12, Q13, are charged by taking a time Tc1, while the snubber capacitors Cs11, Cs14 connected in parallel to the semiconductor switching elements Q11, Q14 in the opposite side (in the side where turning-on is now going to be done) are discharged by taking the time Tc1.

Embodiment 2 has a feature in that, in order to prevent occurrence of short-circuiting of the snubber capacitor connected to the semiconductor switching element, due to the turn-on operation of that semiconductor switching element, the length of the dead time Td1 is set as follows. Namely, in FIG. 9, illustration has been made assuming that the dead time Td1 is longer than the charging/discharging time Tc1 of the snubber capacitor.

Figure 12:
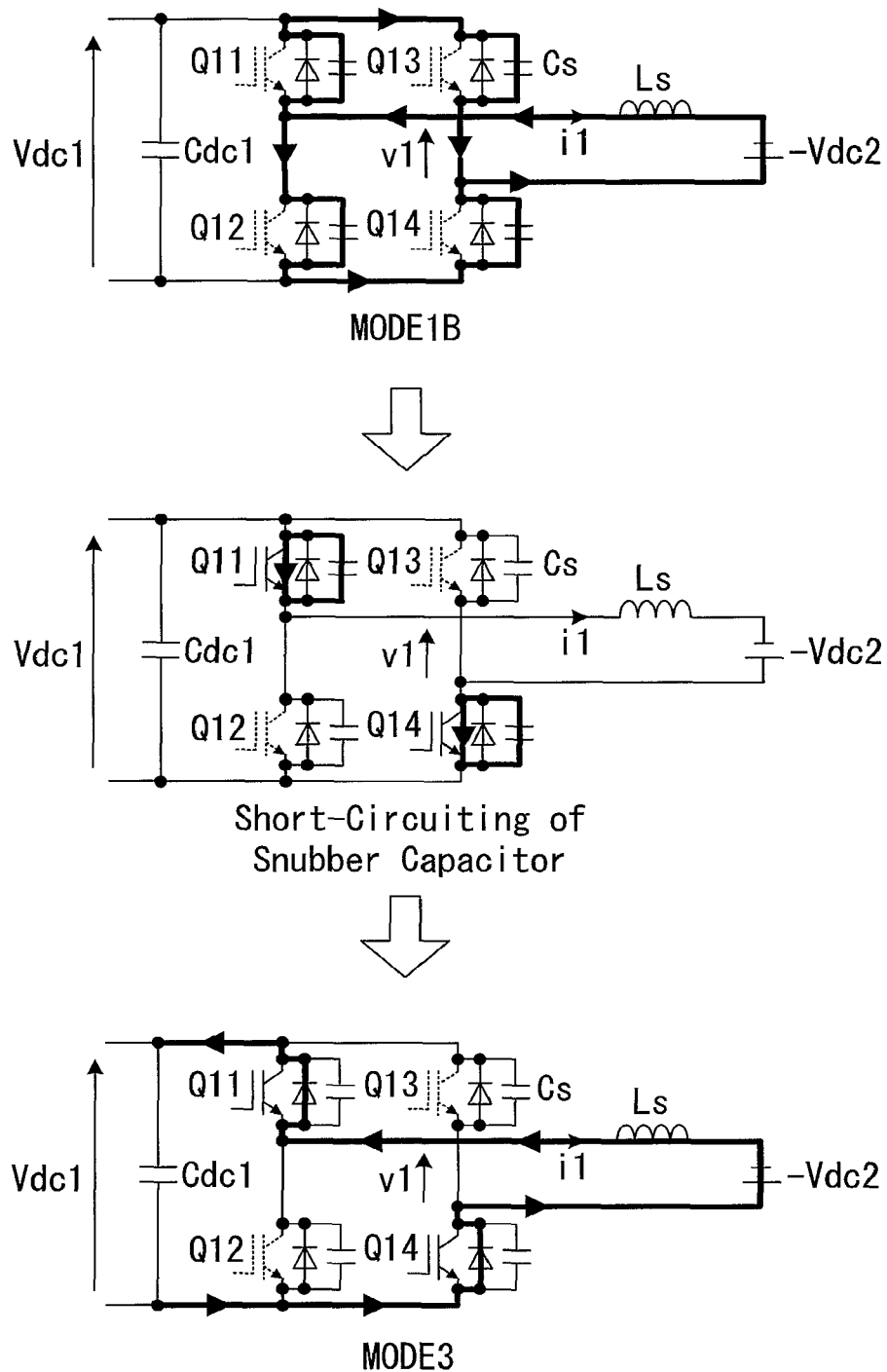
FIG. 12 is a circuit diagram showing a current flowing state in a condition where a snubber capacitor is short-circuited due to turn-on operation of a semiconductor switching element, in a comparative example with respect to Embodiment 2 of the invention.

As a comparative example, such a case where the dead time Td1 is shorter than the charging/discharging time Tc1 of the snubber capacitor, will be described, using FIG. 12, as follows. When the dead time Td1 is shorter than the charging/discharging time Tc1 of the snubber capacitor, and thus the semiconductor switching elements Q11, Q14 change from "turned-off" to "turned-on" without waiting the lapse of the charging/discharging time Tc1, this results in that, at the middle of previously-described MODE1B, these switching elements are turned on in a state where the snubber capacitors Cs11, Cs14 have not yet been discharged completely, to thereby short-circuit these capacitors, as shown in the middle figure in FIG. 12.

In this comparative example, the energy stored in the snubber capacitors Cs11, Cs14 is consumed by the semiconductor switching elements, resulting in increased loss. Namely, zero-voltage switching is not perfectly achieved.

For that reason, Embodiment 2 has a feature in that the dead time Td1 for the power-transferring side converter 1a is set equal to or more than the charging/discharging time Tc1 of the snubber capacitor, as represented by a following formula (4).

[Mathematical 4]

$$Td1 \geq Tc1 \qquad (4)$$

It is noted that, when the dead time Td1 for the power-transferring side converter 1a is to be set based on the formula (4), because the charging/discharging time Tc1 of the snubber capacitor varies according to the transferring power P, a certain degree of flexibility may be considered to determine at what level the transferring power P is to be set.

As described similarly with respect to the formula (3) in aforementioned Embodiment 1, when the dead time Td1 is set in a condition where the transferring power P is the rated power of the power conversion device, it is possible to reduce a required capacity of the cooler, for example, to thereby achieve downsizing thereof.

Furthermore, as described previously, the capacitances of the snubber capacitors Cs11, Cs12, Cs13, Cs14 are set so that charging of the snubber capacitors Cs12, Cs13 and discharging of the snubber capacitors Cs11, Cs14 are completed at a time before the time at which the output current i1 changes from negative to positive. Thus, it is possible to prevent occurrence of recharging of the snubber capacitor after being discharged and before execution of zero-voltage switching.

Further, for example, in the case where the power conversion device is used fox offshore wind power generation or the like, an output of about 40% of the rated value is promising in average. Thus, when the dead time Td1 and the capacitances of the snubber capacitors Cs11, Cs12, Cs13, Cs14 are determined in a condition with 40% of the rated value of the power conversion device, this will result in improvement in the efficiency of the power-transferring.

Figure 13:
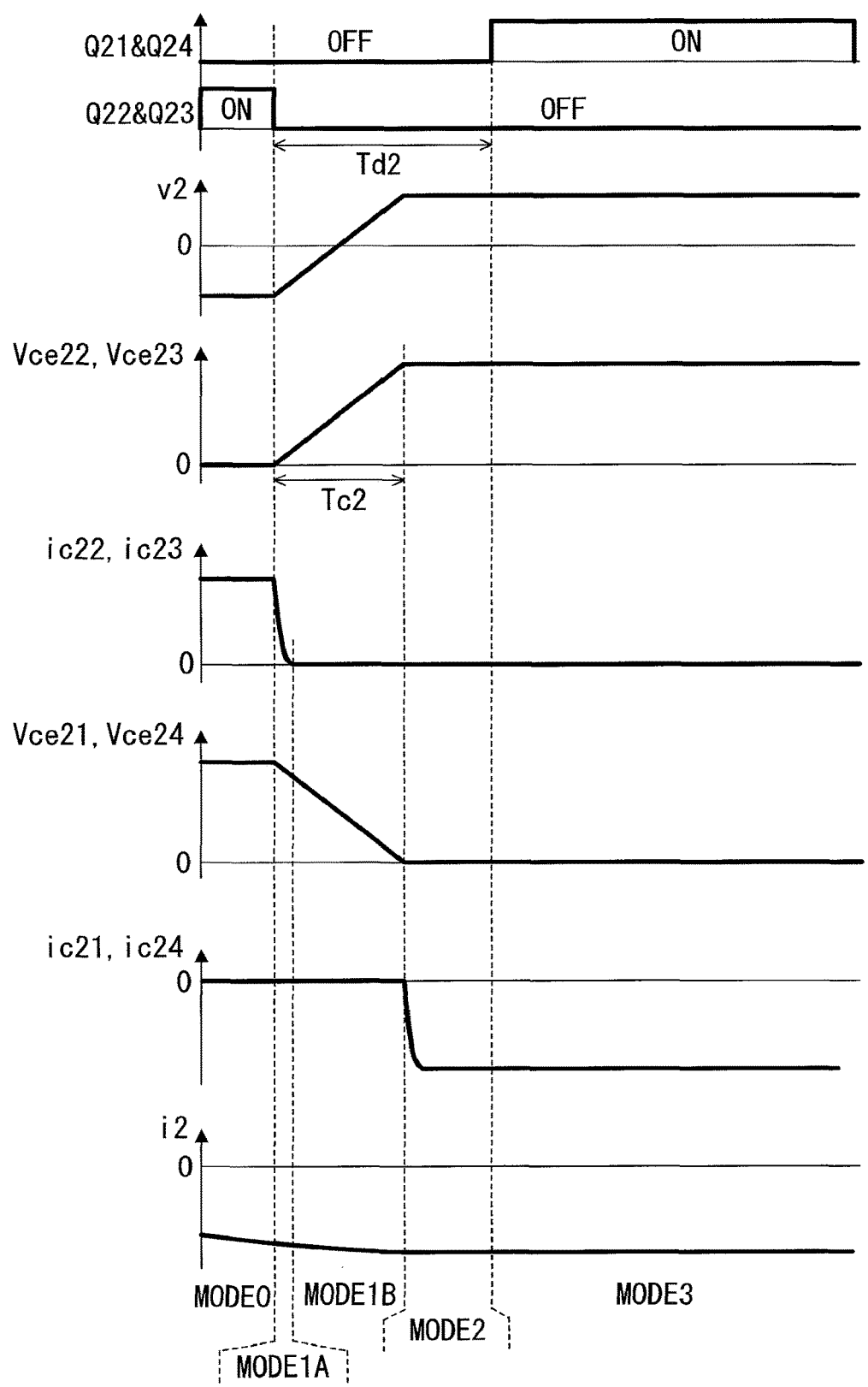
FIG. 13 is a timing chart showing changes in voltages and currents at respective portions when attention is focused, in particular, on switching operations in a power-receiving side converter, according to Embodiment 2 of the invention.

Likewise, description will also be made about the dead time Td2 for the secondary-side (herein provided as the power-receiving side) converter 2a. FIG. 13 is a timing chart showing switching operations in the power-receiving side (secondary-side) converter 2a, in which, attention is paid on an event where the switching states in the secondary-side converter 2a change, and there are specifically shown: switching states of the semiconductor switching elements Q21, Q22, Q23, Q24; the output voltage v2; voltages Vce22, Vce23 across the respective semiconductor switching elements Q22, Q23; currents ic22, ic23 flowing through the semiconductor switching elements Q22, Q23 or the freewheel diodes D22, D23, respectively (when positive, currents flowing through the semiconductor switching elements; when negative, currents flowing through the freewheel diodes); voltages Vce21, Vce24 across the respective semiconductor switching elements Q21, Q24; currents ic21, ic24 flowing through the semiconductor switching elements Q21, Q24 or the freewheel diodes D21, D24, respectively (when positive, currents flowing through the semiconductor switching elements; when negative, currents flowing through the freewheel diodes); and the output current i2 of the secondary-side converter 2a.

Figure 14:
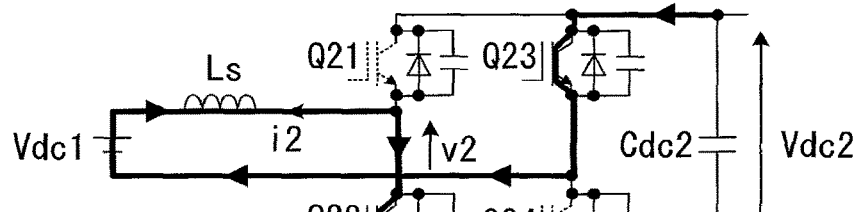
FIG. 14 is a circuit diagram showing a current flowing state in each MODE shown in FIG. 13.
Figure 14:
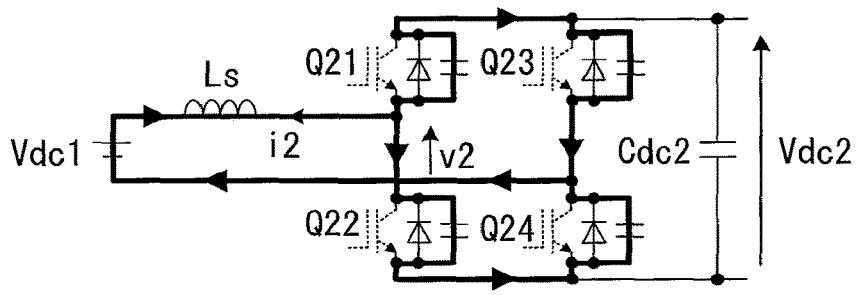
Figure 14:
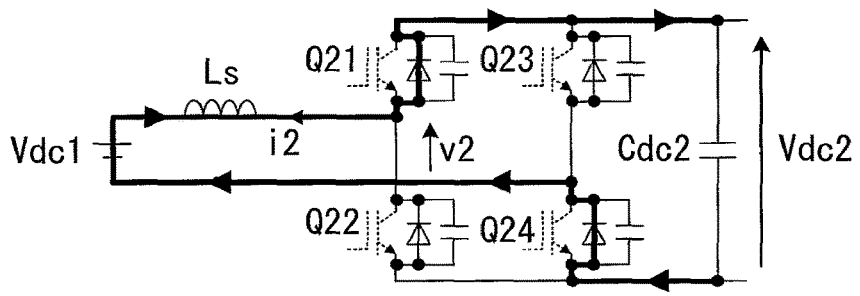
Figure 14:
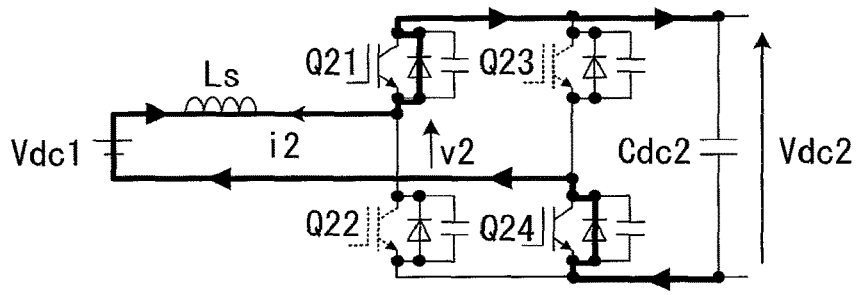

Further, the phenomena shown in FIG. 13 can be described in a manner divided to MODE0 to MODE3, together with FIG. 14 in which current flowing states are shown. Note that in FIG. 14, the leakage inductance is totally indicated by Ls, and the output voltage of the primary-side converter 1a is simulated to be Vdc1.

In FIG. 13 and FIG. 14, in MODE0 as an initial state, the semiconductor switching elements Q21, Q24 are in turned-off states, and the semiconductor switching elements Q22, Q23 are in turned-on states.

In MODE1A that follows these states, the semiconductor switching elements Q22, Q23 change from "turned-on" to "turned-off" while the semiconductor switching elements Q21, Q24 are kept turned-off without change. However, although the currents flowing through the semiconductor switching elements Q22, Q23 can be shut off immediately, the voltages Vce22, Vce23 across them increase moderately due to influence by the snubber capacitors Cs22, Cs23.

Since the turn-off loss is derived from multiplication of a voltage by a current at the time of such change, in comparison to the case where no snubber capacitor is connected, it is possible to reduce the turn-off loss because the current is shut off in a state with a lower voltage.

In the following MODE1B, the snubber capacitors Cs22, Cs23 continue to be charged, and at the same time, the snubber capacitors Cs21, Cs24 continue to be discharged. As final values in MODE1B, the voltages Vce22, Vce23 reach Vdc2, and the voltage Vce21, Vce24 become nearly zero.

In the following MODE2, the switching states in MODE1B are maintained. In the power-receiving side converter 2a in FIG. 13, the output current i2 does not change.

In the following MODE3, the semiconductor switching elements Q21, Q24 change from "turned-off" to "turned-on". The semiconductor switching elements Q22, Q23 are kept turned-off. At this time, because the polarity of the output current i2 is negative, currents are already flowing through the freewheel diodes D21, D24. Namely, in this state, even when the semiconductor switching elements Q21, Q24 change from "turned-off" to "turned-on", the respective voltages Vce21, Vce24 across them do not change, causing no turn-on loss. Namely, zero-voltage switching is achieved, so that a switching loss can be reduced.

In the above description, a large difference from Embodiment 1 resides in MODE1A, MODE1B as described for the aforementioned power-transferring side converter 1a. Namely, when the snubber capacitors Cs21, Cs22, Cs23, Cs24 are connected, the snubber capacitors Cs22, Cs23 connected in parallel to the turned-off semiconductor switching elements Q22, Q23, are charged by taking a time Tc2, while the snubber capacitors Cs21, Cs24 connected in parallel to the semiconductor switching elements Q21, Q24 in the opposite side (in the side where turning-on is now going to be done) are discharged by taking the time Tc2.

In Embodiment 2, in order to prevent occurrence of short-circuiting of the snubber capacitor connected to the semiconductor switching element, due to the turn-on operation of that semiconductor switching element, the length of the dead time Td2 is set as follows. Namely, in FIG. 13, illustration has been made assuming that the dead time Td2 is longer than the charging/discharging time Tc2 of the snubber capacitor.

Figure 15:
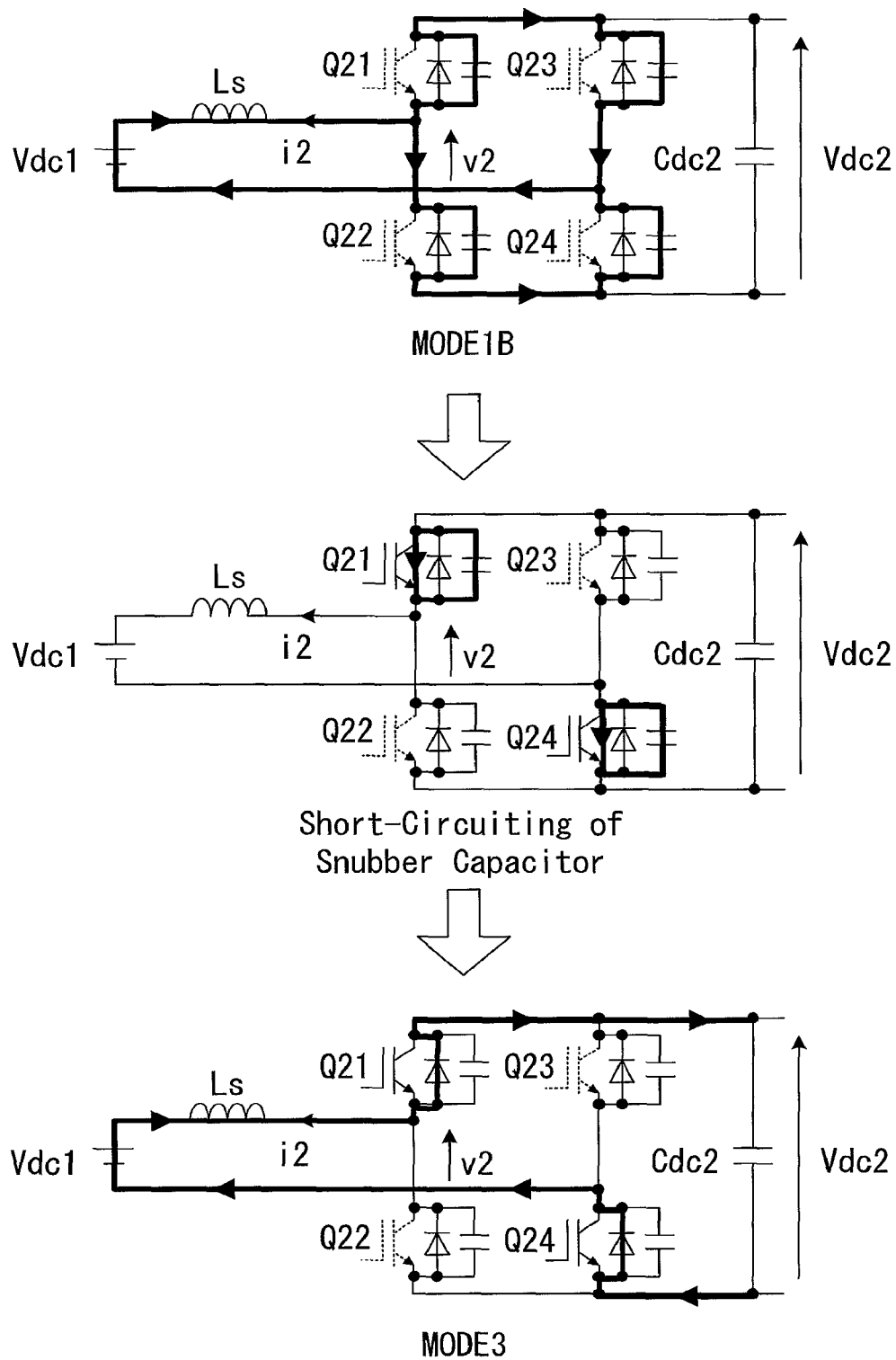
FIG. 15 is a circuit diagram showing a current flowing state in a condition where a snubber capacitor is short-circuited due to turn-on operation of a semiconductor switching element, in a comparative example with respect to Embodiment 2 of the invention.

As a comparative example, such a case where the dead time Td2 is shorter than the charging/discharging time Tc2 of the snubber capacitor, will be described, using FIG. 15, as follows. When the dead time Td2 is shorter than the charging/discharging time Tc2 of the snubber capacitor, and thus the semiconductor switching elements Q21, Q24 change from "turned-off" to "turned-on" without waiting the lapse of the charging/discharging time Tc2, this results in that, at the middle of MODE1B, these switching elements are turned on in a state where the snubber capacitors Cs21, Cs24 have not yet been discharged completely, to thereby short-circuit these capacitors, as shown in the middle figure in FIG. 15.

In this case, the energy stored in the snubber capacitors Cs21, Cs24 is consumed by the semiconductor switching elements, resulting in increased loss. Namely, zero-voltage switching is not perfectly achieved.

For that reason, Embodiment 2 has a feature in that the dead time Td2 for the power-receiving side converter 2a is set equal to or more than the charging/discharging time Tc2 of the snubber capacitor, as represented by a following formula (5).

[Mathematical 5]

$$Td2 \geq Tc2 \tag{5}$$

It is noted that, when the dead time Td2 for the power-transferring side converter 1a is to be set based on the formula (5), as described similarly with respect to the aforementioned formula (4), because the charging/discharging time Tc2 of the snubber capacitor varies according to the transferring power P, it is possible to reduce a required capacity of the cooler, for example, to thereby achieve downsizing thereof, when the dead time Td2 is, for example, set in a condition where the transferring power P is the rated power of the power conversion device.

Further, for example, in the case where the power conversion device is used for offshore wind power generation or the like, an output of about 40% of the rated value is promising in average. Thus, when the dead time Td2 is determined in a condition with 40% of the rated value of the power conversion device, this will result in improvement in the efficiency of the power-transferring.

As described above, in the power conversion device according to Embodiment 2 of the invention, the dead times Td1 and Td2 for the primary-side (power-transferring side) and secondary-side (power-receiving side) converters 1a, 2a, are set equal to or more than the charging/discharging times Tc1, Tc2 of the snubber capacitors, respectively. Thus, it is possible to surely prevent occurrence of short-circuiting of the snubber capacitor connected to the semiconductor switching element, due to the turn-on operation of that semiconductor switching element.

Embodiment 3

Figure 16:
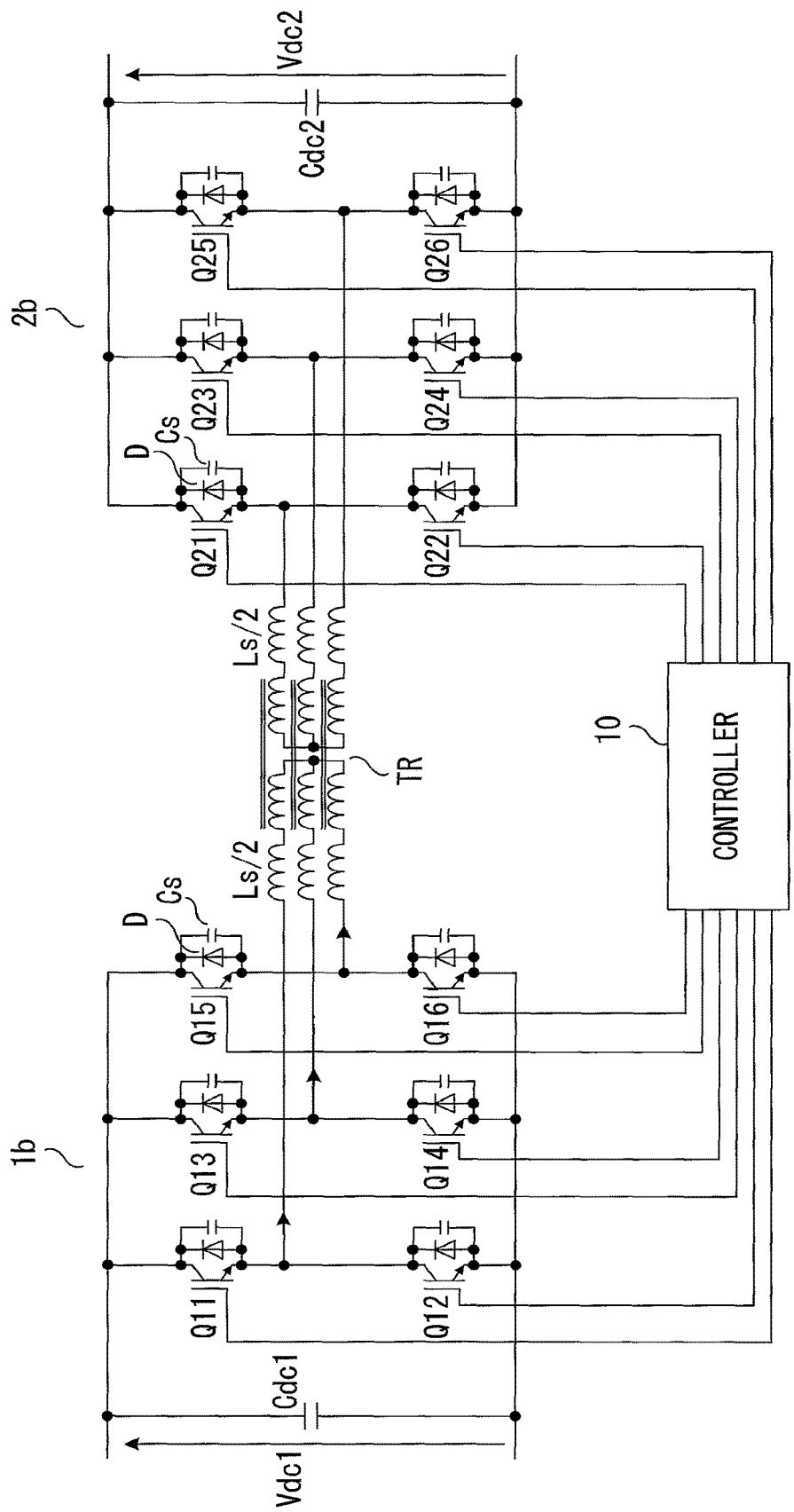
FIG. 16 is a diagram showing an entire configuration of a power conversion device according to Embodiment 3 of the invention.

FIG. 16 is a diagram showing an entire configuration of a power conversion device according to Embodiment 3 of the invention. In Embodiment 3, as shown in FIG. 16, as for converters 1b, 2b, a three-phase bridge circuit configuration is employed. In FIG. 1 and FIG. 8, two switching legs each comprising serially connected semiconductor switching elements are used and the converters 1 (1a), 2 (2a) are configured with single-phase full-bridge circuits, whereas, in Embodiment 3, three switching legs are used and the converters 1b, 2b are configured with three-phase bridge circuits.

Namely, semiconductor switching elements Q15, Q16, Q25, Q26 and their associated freewheel diodes D and, where necessary, snubber capacitors Cs, are added to the configuration of FIG. 1. According to the use of the three-phase bridge circuits, a three-phase transformer TR is used. Note that, the three-phase transformer TR may not necessarily be a transformer for three phases, and three single-phase transformers may be used as the three-phase transformer. Although the leakage inductance is indicated by Ls like in Embodiment 1, an additional inductance may be used. Note that when insulation is not required, only an inductance that is equivalent to Ls may be connected.

When the three-phase bridge circuits are used, the ripple currents flowing through the capacitors Cdc1, Cdc2 can be reduced. Thus, it is allowable to reduce the capacities of the capacitors, so that the power conversion device can be downsized.

Furthermore, when the three-phase bridge circuits are provided with the dead times determined in consideration of the feature of this invention, it becomes possible to achieve further reduction in the loss, which results in further downsizing of the power conversion device.

The basic operation of the three-phase bridge circuit is described in Patent Document 1, Non-Patent Document 1 and the like, so that its detailed description is omitted here. Like in the case of the single-phase full-bridge circuit, the transferring power P is controlled using a phase difference δ [rad] in switching between the primary side and the secondary side, and is represented by a following formula (6) (see, for example, the formula (30) described at p. 68 in Non-Patent Document 1).

[Mathematical 6]

$$P = \frac{Vdc1 \cdot Vdc2}{\omega Ls}\left(\frac{2}{3}\delta - \frac{\delta^2}{2\pi}\right) \quad (6)$$

In the case where the three-phase bridge circuits are used, this invention is also effective because there is a problem related to zero-voltage switching, similar to that described in Embodiments 1, 2. That is, like in Embodiment 1, the dead time Td1 for the power-transferring side converter 1b is set equal to or less than the current-polarity reversal time Tcmtt.

In the case of the three-phase bridge circuit, when such a condition where the output current is zero, and thus the power P is given as zero, is applied to the aforementioned formula (6), the current-polarity reversal time Tcmtt can be calculated in a form of a formula (7) shown below.

[Mathematical 7]

$$Tcmtt = \frac{\frac{4\pi}{3} - \sqrt{\frac{16\pi^2}{9} - 8\frac{\pi\omega LsP}{Vdc1 \cdot Vdc2}}}{4\omega} \quad (7)$$

From the above, in the power conversion device of the invention using the three-phase bridge circuits, it suffices to set the dead time Td1 for the power-transferring side converter 1b so that a following formula (8) is satisfied.

[Mathematical 8]

$$Td1 \leq \frac{\frac{4\pi}{3} - \sqrt{\frac{16\pi^2}{9} - 8\frac{\pi\omega LsP}{Vdc1 \cdot Vdc2}}}{4\omega} \quad (8)$$

In this case, as described similarly with respect to the formula (3) in aforementioned Embodiment 1, when the dead time Td1 is set in a condition where the transferring power P is the rated power of the power conversion device, it is possible to reduce a required capacity of the cooler, for example, to thereby achieve downsizing thereof.

Further, for example, in the case where the power conversion device is used for offshore wind power generation or the like, an output of about 40% of the rated value is promising in average. Thus, when the dead time Td1 is determined in a condition with 40% of the rated value of the power conversion device, this will result in improvement in the efficiency of the power-transferring.

Further, the dead time Td2 for the power-receiving side converter 2b may be set longer because, for that dead time, there is no restriction related to zero-voltage switching. Namely, when the dead time Td2 for the power-receiving side converter 2b is set longer than the dead time Td1 for the power-transferring side converter 1b, the reliability of the device is improved because there is no dead time that is set unnecessarily short.

Furthermore, as the withstand voltage of the semiconductor switching element becomes higher, the change in gate voltage becomes more moderate, and thus a longer dead time has to be ensured. Accordingly, in the case where the direction of the power-transferring in the power conversion device is unchanged or the power-transferring side and power-receiving side converters 1b, 2b are determined according to the lengths of the average operation times for power-transferring and power-receiving, the rated voltage of the secondary-side semiconductor element is set higher than the rated voltage of the primary-side semiconductor element, to thereby establish a configuration which can perform boosting operation from a lower voltage to a higher voltage.

This makes it possible, by setting the dead time for the power-transferring side converter 1b to be short and the dead time for the power-receiving side converter 2b to be long, to achieve zero-voltage switching to thereby provide a low-loss power conversion device, without affecting the reliability of the semiconductor element.

Such a way for use is best suited to an DC/DC conversion application for performing boosting from a source of low-voltage energy, for example, renewable energy, etc. toward a high-voltage power system or load.

Further, when the snubber capacitors are connected in parallel to the respective semiconductor switching elements, as described similarly in aforementioned Embodiment 2, the capacitances of the snubber capacitors are set so that charging/discharging of the snubber capacitors Cs are completed at a time before the time at which each current in the respective phases change from negative to positive.

Further, when the dead times Td1 and Td2 for the converters 1b, 2b are set equal to or more than the charging/discharging times Tc1, Tc2 of the snubber capacitors of the converters 1b, 2b, respectively, it is possible to surely prevent occurrence of short-circuiting of the snubber capacitor connected to the semiconductor switching element, due to the turn-on operation of that semiconductor switching element.

Further, in that case, because the charging/discharging times Tc1, Tc2 of the snubber capacitors vary according to the transferring power P, it is possible to reduce a required capacity of the cooler, for example, to thereby achieve downsizing thereof, when the dead times Td1, Td2 are, for example, set in a condition where the transferring power P is the rated power of the power conversion device.

Further, for example, in the case where the power conversion device is used for offshore wind power generation or the like, an output of about 40% of the rated value is promising in average. Thus, when the dead time Td2 is determined in a condition with 40% of the rated value of the power conversion device, this will result in improvement in the efficiency of the power-transferring.

Embodiment 4

Figure 17:
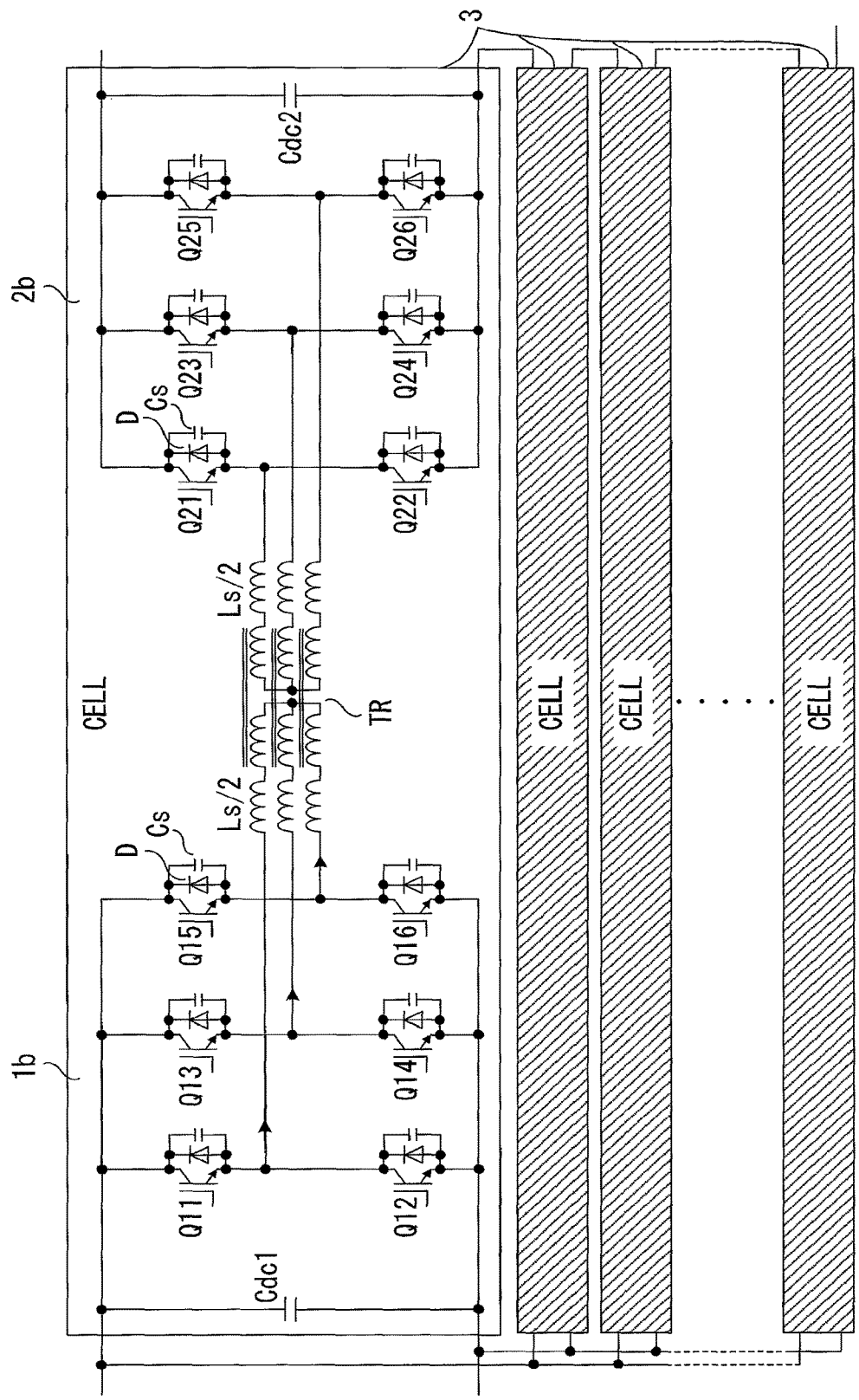
FIG. 17 is a diagram showing a main circuit configuration of a power conversion device according to Embodiment 4 of the invention.

FIG. 17 is a diagram showing a main circuit configuration of a power conversion device according to Embodiment 4 of the invention. In Embodiment 4, assuming that the main circuit of the power conversion device of any one of Embodiments 1 to 3 is a unit cell 3, there are provided plural unit cells, for example, fifty unit cells, each being said unit cell 3, and their respective capacitors Cdc1 (or Cdc2) to which the primary-side (or secondary-side) DC voltages are applied, are connected serially or in parallel to each other.

In the example shown in FIG. 17, such a configuration is established in which the main circuit according to Embodiment 3 is used as the unit cell 3, and the primary-side capacitors Cdc1 of the plural unit cells 3 are connected in parallel to each other while the secondary-side capacitors Cdc2 are serially connected to each other.

In such a case, although the example is shown as using the three-phase-bridge based converters 1b, 2b, single-phase-bridge based converters may be used as in Embodiment 1 or Embodiment 2.

Note that it is also allowable to mutually exchange the respective connection configurations of the capacitors Cdc1, Cdc2 between the primary side and the secondary side or to select a connection configuration in which serial connection and parallel connection are combined, for the primary side or the secondary side, according to the currents and the voltages handled in the primary side and the secondary side in the entire power conversion device.

In this embodiment, the plural unit cells 3 are connected serially and in parallel to each other to thereby configure a main circuit, and the configuration shown in Embodiments 1 to 3 is applied to each of the unit cells 3, so that an effect similar to in Embodiments 1 to 3 is obtained for every unit cell 3.

In addition, in the primary side or the secondary side where the capacitors Cdc of the unit cells 3 are connected serially to each other, it is possible to handle a DC voltage that is higher than that in the configuration shown in Embodiments 1 to 3. Further, in the side where the capacitors Cdc of the unit cells 3 are connected in parallel to each other, it is possible to handle a DC current that is larger than that in the configuration shown in Embodiments 1 to 3. Namely, it becomes possible to achieve a power increase of the power conversion device.

Furthermore, when the plural unit cells 3 are configured to be equivalent to each other, the operation test of the power conversion device can be simplified, and further the fabrication thereof becomes easier.

It is noted that, in the aforementioned respective embodiments, silicon is generally used as materials of the semiconductor switching element and the freewheel diode; however, when a wide bandgap material, such as silicon carbide, a gallium nitride-based material, diamond or the like whose bandgap is wider than that of silicon, is used instead, it is possible to make the withstanding voltage of the semiconductor element higher, so that a higher voltage can be converted. Furthermore, it is possible to make switching faster, so that the transformer TR can be downsized.

It should be noted that unlimited combination of the respective embodiments, and appropriate modification or omission in the embodiments may be made in the present invention without departing from the scope of the invention.

The invention claimed is:

1. A power conversion device, comprising:
a primary-side converter which comprises plural primary-side switching legs each connected between both electrodes of a primary-side capacitor and each including positive-side and negative-side semiconductor elements which are serially connected to each other and which are each provided with a snubber capacitor connected in parallel thereto, said primary-side converter performing power conversion between primary-side AC terminals each drawn out from an intermediate connection point of each of the primary-side switching legs, and the primary-side capacitor;
a secondary-side converter which comprises plural secondary-side switching legs each connected between both electrodes of a secondary-side capacitor and each including positive-side and negative-side semiconductor elements which are serially connected to each other, said secondary-side converter performing power conversion between secondary-side AC terminals each drawn out from an intermediate connection point of each of the secondary-side switching legs, and the secondary-side capacitor;
an inductance element connected between the primary-side AC terminals and the secondary-side AC terminals; and
a control device which controls turning on/off of semiconductor switching elements which constitute the respective positive-side and negative-side semiconductor elements, to thereby perform power transferring or receiving of DC power between the primary-side capacitor and the secondary-side capacitor;
wherein a capacitance of each snubber capacitor is set so that, at the time the primary-side converter executes a power-transferring operation, in that converter, a polarity of a current flowing through the AC terminals changes after completion of charging/discharging of each snubber capacitor due to changes in on/off states of the semiconductor elements;
wherein the control device controls said turning on/off, by setting a short-circuit prevention period Td for preventing short circuiting from occurring in each of the respective switching legs due to simultaneous turn-on operations of the positive-side and negative-side semiconductor switching elements commonly included therein, so as to achieve zero-voltage switching which causes each of these semiconductor switching elements to perform a turn-on operation at zero voltage;
wherein the short-circuit prevention period Td for the primary-side converter is set so as to prevent occurrence of short-circuiting of the snubber capacitor connected to the semiconductor switching element, due to the turn-on operation of that semiconductor switching element; and
wherein the short-circuit prevention period Td for either one of the primary-side and secondary-side converters is set to have a relationship with a current-polarity reversal time Tcmtt so that Td≤Tcmtt is satisfied, said current-polarity reversal time Tcmtt being a period of time, when that converter executes the power-transferring operation, from a start time of said short-circuit prevention period Td until a polarity of an AC current flowing through the inductance element is reversed.

2. The power conversion device of claim 1, wherein, when either one of the primary-side and secondary-side converters, whose average operation time for said power-transferring is longer than its average operation time for said power-receiving, is referred to as a power-transferring side converter, the short-circuit prevention period Td for the power-transferring side converter satisfies Td≤Tcmtt.

3. The power conversion device of claim 1, wherein the inductance element is a transformer which includes a primary-side winding connected to the AC terminals of the primary-side converter and a secondary-side winding connected to the AC terminals of the secondary-side converter, and electrically insulates the primary-side converter and the secondary-side converter from each other.

4. The power conversion device of claim 1, wherein the inductance element is an inductance connected between the AC terminals of the primary-side converter and the AC terminals of the secondary-side converter.

5. The power conversion device of claim 2, wherein, when either one of the primary-side and secondary-side converters, whose average operation time for said power-transferring is shorter than its average operation time for said power-receiving, is referred to as a power-receiving side converter, the inductance element is a transformer which includes a primary-side winding connected to the AC terminals of the power-transferring side converter and a secondary-side winding connected to the AC terminals of the power-receiving side converter, and electrically insulates the power-transferring side converter and the power-receiving side converter from each other; and the control device sets the short-circuit prevention period Td for the power-receiving side converter to be longer than the short-circuit prevention period Td for the power-transferring side converter.

6. The power conversion device of claim 5, wherein the number of turns of the winding connected to the power-receiving side converter is larger than the number of turns of the winding connected to the power-transferring side converter.

7. The power conversion device of claim 1, wherein the current-polarity reversal time Tcmtt is set to a value calculated in a condition where the power subject to said power transferring or receiving is rated power of the power conversion device.

8. The power conversion device of claim 1, wherein the current-polarity reversal time Tcmtt is set to a value calculated in a condition where the power subject to said power transferring or receiving is 40 percent of rated power of the power conversion device.

9. The power conversion device of claim 1, wherein the short-circuit prevention period Td for the primary-side converter is set to have a relationship with a charging or discharging time Tc of the snubber capacitor so that Td≥Tc is satisfied.

10. The power conversion device of claim 9, wherein the charging or discharging time Tc of the snubber capacitor is set to a value calculated in a condition where the power subject to said power transferring or receiving is rated power of the power conversion device.

11. The power conversion device of claim 9, wherein the charging or discharging time Tc of the snubber capacitor is set to a value calculated in a condition where the power subject to said power transferring or receiving is 40 percent of rated power of the power conversion device.

12. The power conversion device of claim 1, wherein each of these converters includes two said switching legs and is configured as a single-phase full bridge for performing power conversion between a DC voltage and a single-phase AC voltage.

13. The power conversion device of claim 1, wherein each of these converters includes three said switching legs and is configured as a three-phase bridge for performing power conversion between a DC voltage and a three-phase AC voltage.

14. The power conversion device of claim 1, which is provided with plural unit cells, each of said unit cells including the primary-side converter, the secondary-side converter and the inductance element, and the respective primary-side or secondary-side capacitors in said unit cells being serially connected to each other.

15. The power conversion device of claim 1, which is provided with plural unit cells, each of said unit cells including the primary-side converter, the secondary-side converter and the inductance element, and the respective primary-side or secondary-side capacitors in said unit cells being connected in parallel to each other.

* * * * *